United States Patent
Wiggins

(10) Patent No.: US 12,321,334 B2
(45) Date of Patent: Jun. 3, 2025

(54) DETECTING MISSING DATA IN A DIGITAL DATA REPOSITORY ACCORDING TO DATA ATTRIBUTES AND A SET OF DIGITAL DATA REQUIREMENTS

(71) Applicant: OneTrust LLC, Atlanta, GA (US)

(72) Inventor: Shane Wiggins, Atlanta, GA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

(21) Appl. No.: 18/454,576

(22) Filed: Aug. 23, 2023

(65) Prior Publication Data

US 2025/0068620 A1 Feb. 27, 2025

(51) Int. Cl.
*G06F 16/23* (2019.01)
*G06F 16/906* (2019.01)
(52) U.S. Cl.
CPC ........ *G06F 16/2365* (2019.01); *G06F 16/906* (2019.01)
(58) Field of Classification Search
CPC .............................. G06F 16/2365; G06F 16/906
See application file for complete search history.

(56) References Cited

U.S. PATENT DOCUMENTS

| 10,489,376 | B2* | 11/2019 | Schultz | G06F 16/25 |
| 2013/0006992 | A1* | 1/2013 | Dani | G06F 16/252 |
| | | | | 707/E17.046 |
| 2020/0019558 | A1* | 1/2020 | Okorafor | G06F 21/6254 |
| 2022/0318273 | A1* | 10/2022 | Sinkar | G06F 16/215 |

\* cited by examiner

*Primary Examiner* — Huawen A Peng
(74) *Attorney, Agent, or Firm* — Ballard Spahr LLP

(57) ABSTRACT

Methods, systems, and non-transitory computer readable storage media are disclosed for detecting missing data in a digital data repository according to a set of digital data requirements and extracted data attributes for correcting database operations. The disclosed system utilizes a classifier model to classify digital content items via an integration with the digital data repository. The disclosed system generates mappings indicating that the digital content items correspond to digital data requirements of a data policy based on the classifications. The disclosed system utilizes the mappings to determine that one or more types of data are missing from the digital data repository as indicated by the digital data requirements. The disclosed system generate an indication of the data missing from the digital data repository for use in performing additional operations, such as modifying a database operation having access to the digital content items to prevent further errors.

20 Claims, 11 Drawing Sheets

Scan Results

Dataset 1 → Policy 1

| Classifications | Priority | Number | Violations |
|---|---|---|---|
| Classification 1 | High | 23,212 | 50 (Link) |
| Classification 2 | Low | 580 | 3 (Link) |
| Classification 3 | Medium | 19 | 0 |

Generating Classifications Of Digital Content Items Utilizing A Classifier Model *1002*

Generating Mappings Between The Digital Content Items And Digital Data Requirements *1004*

Determining That The Digital Data Requirements Indicate Missing Data *1006*

Generating An Indication Of The Missing Data For Display At A Client Device *1008*

DETECTING MISSING DATA IN A DIGITAL DATA REPOSITORY ACCORDING TO DATA ATTRIBUTES AND A SET OF DIGITAL DATA REQUIREMENTS

BACKGROUND

Advances in computer processing and data storage technologies have led to a significant increase in the amount and types of data moved to digital environments for processing and management. Specifically, many entities utilize computing devices to store, analyze, transmit, and/or perform a number of computing operations on different types of data in various computing environments. Computing systems handling (e.g., collecting, receiving, transmitting, storing, processing, sharing, and/or the like) certain types of digital data are often subject to handling such data in connection with various internal or external data requirements, such as security, privacy, legal, or ethical requirements. Some entities perform various operations on digital data, such as categorizing and/or labeling various data elements from digital datasets, for use in identifying data sources of specific digital data types or in downstream operations involving the digital data. For example, entities that provide data processes in connection with various privacy and security industries often collect, receive, transmit, store, process, or share information (e.g., personally identifiable information or "PII") covered by one or more internal or external data requirements.

Additionally, many entities implement automated data processes to manage digital data in computing environments. For instance, these entities utilize various automated processes (e.g., database operations) to generate, store, modify, or delete digital data in connection with operations of the entities. Automated data process in computing environments, however, can sometimes be unreliable for a number of reasons. Specifically, hardware failures (e.g., failures in a storage device, memory, or a CPU) can result in scheduled data processes being performed incorrectly (or not at all), thereby resulting in mishandling of certain data. To illustrate, a failure of a given data process to create a backup of certain data types or storage locations can result in data being deleted prematurely.

Furthermore, implementing certain data processes (including automated or manual processes) accurately can be difficult and can thus require sufficient knowledge or expertise to implement correctly. Implementing a data process incorrectly (e.g., due to incorrect function calls, typos, or other coding errors) can result in certain digital data being erroneously moved or deleted from a specific location. As an example, a data process intended to move or delete a first data type from a particular location may incorrectly move or delete a second data type from the location or from a different location. Such errors can cause additional errors in downstream operations involving the incorrectly affected data and/or result in non-compliance issues with respect to one or more digital data requirements due to the gaps in specific categories of data.

SUMMARY

This disclosure describes various aspects for detecting missing data in a digital data repository according to a set of digital data requirements and extracted data attributes for correcting database operations. For example, the disclosed systems utilize integrated scanning systems to classify digital data at a digital data repository for detecting missing data related to a set of digital data requirements of a data policy. Specifically, the disclosed systems utilize a classifier model to classify digital content items via an integration with the digital data repository (e.g., via a third-party system with access to the digital data repository). Additionally, the disclosed systems generate mappings indicating that the digital content items correspond to digital data requirements of a data policy based on the classifications of the digital content items. The disclosed systems utilize the mappings of the digital content items to the digital data requirements to determine that one or more types of data are missing from the digital data repository as indicated by the digital data requirements. Furthermore, the disclosed systems can generate an indication of the data missing from the digital data repository for use in performing one or more additional operations, such as modifying a database operation having access to the digital content items to prevent further errors. The disclosed systems thus provide efficient and accurate detection of missing data in a computing environment and correction of database operations that cause the missing data.

BRIEF DESCRIPTION OF THE DRAWINGS

Various aspects will be described and explained with additional specificity and detail through the use of the accompanying drawings.

FIG. 8 illustrates an example of a graphical user interface displaying results of a scanning operation in accordance with one or more aspects.

DETAILED DESCRIPTION

Figure 1:
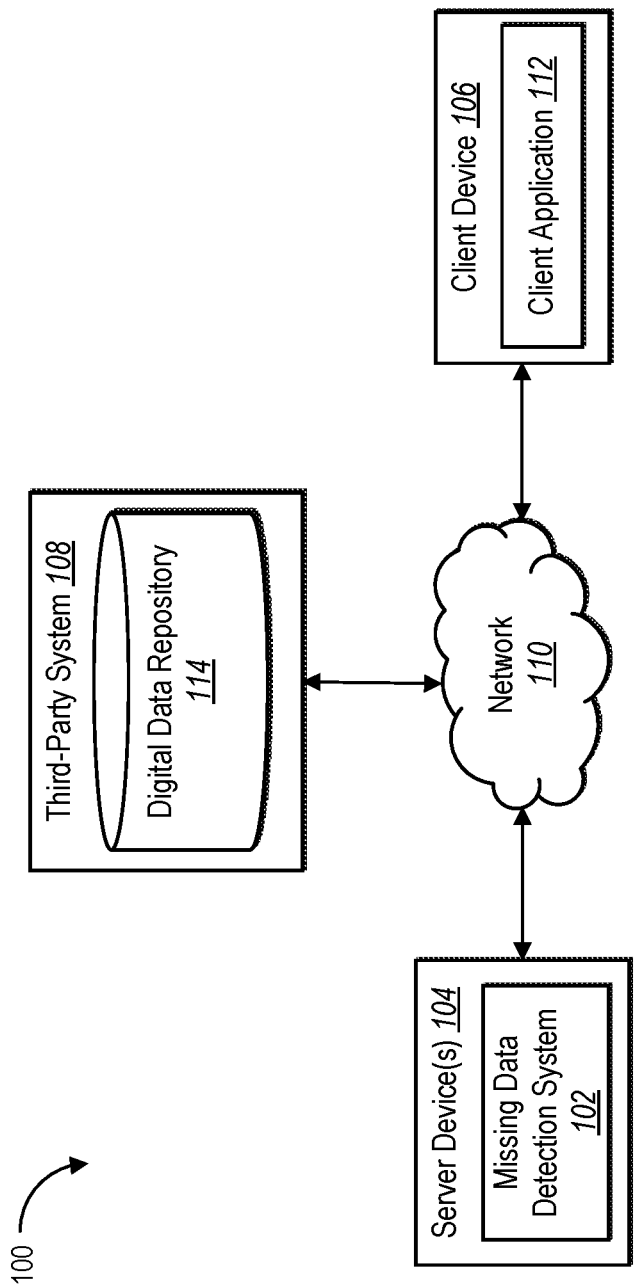
FIG. 1 illustrates an example of a system environment in which a missing data detection system can operate in accordance with one or more aspects.

This disclosure describes one or more aspects of a missing data detection system that automatically detects digital data that is missing from a digital data repository as indicated by various digital data requirements. In particular, the missing data detection system utilizes a scanning system to scan and classify a plurality of digital content items stored at a digital data repository. The missing data detection system utilizes classifications of the digital content items to determine whether and how the digital content items correspond to a set of digital data requirements of a data policy. Furthermore, based on mappings of the digital content items to the digital data requirements, the missing data detection system determines that the digital content items are missing data (e.g., one or more categories of data) required by the digital data requirements. In connection with detecting the missing data, the missing data detection system provides an indication of the missing data for display at a client device. Furthermore, in one or more aspects, the missing data detection system modifies a database operation (or provides recommendations to modify the database operation) accessing the digital content items to correct for the missing data.

As mentioned, in one or more aspects, the missing data detection system scans and classifies digital content items stored at a digital data repository. Specifically, the missing data detection system utilizes a scanning system to access (e.g., extract) the digital content items stored at a digital data repository. For example, the missing data detection system integrates with a third-party system having access to the digital data repository to extract the digital content items from the digital data repository. Additionally, the missing data detection system utilizes a classifier model to classify the digital content items in various categories of data according to attributes of the digital content items.

In one or more aspects, the missing data detection system utilizes the classifications of the digital content items to determine relationships with a set of digital data requirements of a data policy. For instance, the missing data detection system generates mappings between the digital content items and the digital data requirements based on the classifications of the digital content items. An example of generating these mappings includes updating a table or other data structure with records or other data objects containing data identifying a relationship between one or more digital content item and one or more digital data requirements (e.g., a particular digital content item is subject to a particular data policy imposing certain data retention requirements). In additional aspects, the missing data detection system utilizes context data associated with the digital content items to determine whether (and how) the digital data requirements apply to each of the digital content items. To illustrate, the data policy includes various requirements indicating how to generate, store, transmit, or otherwise handle data in (or including) the digital content items.

In response to mapping the digital content items to the digital data requirements, the missing data detection system determines whether the digital data repository is missing data required by the digital data requirements. To illustrate, the digital data requirements can include various time, data type, or other requirements that indicate that the digital data repository should include one or more digital content items. Accordingly, the missing data detection system can detect that one or more digital content items are missing from the required digital content items in response to comparing attributes of the digital content items to the various digital data requirements of the data policy according to the mappings.

Furthermore, in one or more aspects, the missing data detection system generates a notification of missing data for display at a client device. In particular, the missing data detection system can generate a message including information associated with the missing data, such as a digital data requirement associated with a particular violation of a data policy, a data type of the missing data, and/or other context information for the missing data. Additionally, the missing data detection system can generate a recommendation to correct a cause of the missing data, such as by automatically determining the cause of the missing data and providing a recommendation to correct the cause of the missing data at the digital data repository.

In connection with providing a notification associated with the missing data, the missing data detection system can also cause one or more computing devices to modify a database operation associated with storing, updating, or otherwise handling specific data types at the digital data repository. To illustrate, the missing data detection system provides automated remediation a cause of missing data by leveraging an integration with the digital data repository to modify a database operation that results in the missing data. The missing data detection system can thus detect missing data and automatically prevent future issues of missing data by causing one or more devices to correct the corresponding database operations.

As an example, the missing data detection system can utilize a software/hardware integration (e.g., via one or more API calls, database operations, or executables installed on the computing devices) to automatically apply a specific control on a specific dataset or data type according to a set of digital data requirements of a data policy. To illustrate, the missing data detection system executes computing instructions (or causes a computing device to execute instructions) to implement a control to modify a computing function that accesses digital content items at a digital data repository. In additional aspects, the missing data detection system provides tools for a user to implement such controls at the digital data repository in connection with managing the digital content items.

In one or more aspects, the missing data detection system improves upon shortcomings of conventional systems in relation to managing digital data via various data processes at computing systems. In contrast to conventional systems that are unable to detect when data is missing except during the failure of data processes, the missing data detection system can automatically detect missing data via data extraction and categorization in connection with digital representations of digital data requirements. In particular, the missing data detection system utilizes attributes of digital content items extracted from a digital data repository to determine whether the storage and handling of the digital content items meets one or more digital data requirements of a data policy. By automatically detecting data that is missing from a digital data repository, and thereby violating the digital data requirement(s), the missing data detection system can detect data and configuration gaps in a computing system. Furthermore, because such computing systems often involve several different computing devices in communication with each other to handle data in connection with one or more data processes, detecting data and configuration gaps can allow the missing data detection system to implement controls to correct data processes and prevent future data/configuration gaps.

In one or more aspects, by detecting missing data in a computing environment in connection with various digital data requirements, the missing data detection system can also improve the accuracy of computing systems implementing various data processes. Specifically, the missing data detection system utilizes the detection of missing data in connection with digital data requirements to correct causes of the missing data. For instance, the missing data detection system can leverage the attributes of missing data (e.g., data types, timestamps, storage locations) to determine one or more database operations that cause the missing data in non-compliance with the digital data requirements. Furthermore, by determining one or more database operations causing missing data at the digital data repository, the missing data detection system can automatically modify, or generate recommendations to modify, the database operation(s) at one or more computing devices. More specifically, the missing data detection system can cause the devices (e.g., a third-party computing system) to execute processing instructions to update scripts, executables, or other code that handles specific data or data types to prevent future missing data in connection with one or more data processes.

Furthermore, by automatically detecting missing data, the missing data detection system can improve the accuracy of downstream computing operations involving the missing data. In particular, as mentioned, missing data in a computing system can cause errors in data processes that require the missing data to produce accurate results or even to execute various operations in the data processes. By detecting missing data and determining a cause of the missing data (e.g., in one or more database operations), the missing data detection system can identify and assist in the correction of causes of certain errors in software. Thus, the missing data detection system can improve the accuracy and functionality of various computing operations in connection with digital data requirements of one or more data policies.

Turning now to the figures, FIG. 1 includes an aspect of a system environment 100 in which a missing data detection system 102 is implemented. In particular, the system environment 100 includes server device(s) 104, a client device 106, and a third-party computing system 108 in communication via a network 110. Moreover, as shown, the client device 106 includes a client application 112. In addition, the third-party computing system 108 includes a digital data repository 114.

As shown in FIG. 1, in one or more aspects, the server device(s) 104 include or host the missing data detection system 102. Specifically, the missing data detection system 102 includes, or is part of, one or more systems that utilize one or more data processes or other data processes to process digital data and/or provide other services associated with the third-party computing system 108. For example, the missing data detection system 102 (or another system) provides tools to the client device 106 for managing data associated with an entity for performing various data processes for the entity. In at least some aspects, the missing data detection system 102 provides tools to the client device 106 via the client application 112 for viewing and managing information associated with data that the entity handles, including data stored at one or more digital data repositories (e.g., the digital data repository 114) of the third-party computing system 108. In one or more aspects, the missing data detection system 102 installs or communicates with software at the client device (e.g., via the client application 112) and/or at the third-party computing system 108 to extract data and perform one or more data processes on the data in connection with managing controls related to one or more data policies.

As used herein, the term "data policy" refers to a set of standards or laws for handling specific data types. To illustrate, data policies associated with regulations include, for example, an external set of digital data requirements for handling specific types of data in connection with a set of practices established by a regulatory body such as the International Organization for Standardization ("ISO"), internally by a particular organization (e.g., a multinational corporation), or a territory government (e.g., the European Union). Additionally, a data policy can include internal digital data requirements for handling data within computing devices associated with a single entity. Such internal digital data requirements can incorporate third-party requirements (e.g., replicating or inserting a requirement specified in an ISO standard or in a legal authority for a certain jurisdiction), be based on third-party requirements (e.g., a requirement meeting criteria specified in multiple third-party frameworks or by different legal authorities in different jurisdictions), and/or be independent of any third-party requirements (e.g., policies developed by an entity without reliance on third-party frameworks or that are not required by any legal authority). The missing data detection system 102 (or another system) thus provides tools to manage the use, environment, or other attributes associated with functions or infrastructure handling specific data types and/or using machine-learning models in connection with a particular data policy.

As used herein, the term "control" refers to a tool or function for satisfying a digital data requirement of a data policy for a computing environment. An example of a control is a procedure or practice for storing, redacting, encrypting, transferring, or otherwise handling a specific data type in a computing environment that entities are required to follow in connection with a regulation governing security or privacy. For instance, a control can include requirements for handling personally identifiable information, financial information, medical information, legal information, or other data types in computing devices or transmissions between computing devices.

Furthermore, in one or more aspects, a control action includes an action to install a particular control for handling specific data types. To illustrate, control actions can include actions for redacting specific data types from digital content items, encrypting specific data types, grouping specific data types, excluding specific data types from communications, etc. Control actions can also include actions for modifying environments associated with digital content items, including implementing specific database operations for computing devices that handle data types, monitoring physical environments, installing environmental protections, restricting or reviewing access authorization to physical data centers, installing physical security controls, implementing specific security or privacy rules within an organization, etc.

In one or more aspects, the missing data detection system 102 manages database, contents of databases, computing devices, or other components of an environment in which an entity handles specific data types covered by a particular data policy via the use of data objects. As used herein, the term "data object" refers to a digital object for tracking and storing information associated with managing systems, software, data sources, entities, or other functions or infrastructure involved in handling specified data for an entity. For example, a data object can include a digital representation of the entity itself, a sub-entity such as subsidiary of the entity, a business unit of the entity, a data asset, a project, a dataset, digital content items in a dataset, a computing operation such as a data process, or a node or attribute of a graph-based taxonomy. Data objects can include node data objects representing nodes in a graph-based taxonomy or attribute data objects representing attributes of nodes in the graph-based taxonomy. Additionally, in some aspects, the missing data detection system 102 utilizes different types of data objects to represent different types of components, such as a data asset object representing a data asset (e.g., hardware device or cluster of devices, a software application, a website), a dataset object to represent a dataset, a document object to represent a digital document, etc. In additional aspects, data objects include, but are not limited to, control objects representing controls for data policies, evidence objects representing evidence tasks for collecting evidence of implemented controls, or data assets (e.g., computing components) on which data processes operate.

Additionally, as used herein, the term "data process" refers to a computing process that performs one or more actions associated with specified data. In some aspects, a data process is represented by a data object (e.g., a data process object). For example, the missing data detection system 102 generates/stores a data object representing a data process including, but not limited to, a computing process or action corresponding to execution of processing instructions (e.g., by utilizing a database operation) to process, collect, access, store, retrieve, modify, or delete target data. To illustrate, for target data including credit card information and payment information associated with processing a credit card transaction, the missing data detection system 102 generates a data object to represent a data process that collects the credit card information through a form (e.g., webpage) provided via the website and processes the credit card information with the appropriate card provider to process the credit card transaction.

As mentioned, the missing data detection system 102 also provides tools for detecting missing data stored at one or more computing devices in connection with a data policy. To illustrate, the missing data detection system 102 scans and classifies data at the digital data repository 114 to determine compliance of the data at the digital data repository 114 according to the data policy. Additionally, in connection with scanning and classifying the data at the digital data repository 114, the missing data detection system 102 also detects data that is missing from the digital data repository 114 as indicated by the digital data requirements. Thus, the missing data detection system 102 can determine whether various data processes associated with the digital data repository 114 are in compliance with the data policy based on existing data in the digital data repository 114 and data that is not in the digital data repository 114. The missing data detection system 102 can also provide tools for implementing (automatically at the server device(s) 104 or in response to user input via the client device 106) modifications to computing operations to correct detected issues (e.g., via one or more downstream operations that implement changes to data or data processes).

According to one or more aspects, the missing data detection system 102 manages data objects by communicating with the client device 106 and/or the third-party computing system 108. Specifically, the missing data detection system 102 can communicate with the client device 106 and/or the third-party computing system 108 to generate data objects representing data and/or to determine or otherwise obtain information associated with the data objects. The missing data detection system 102 may be configured to communicate with the client device 106 and/or the third-party computing system 108 on behalf of the entity via an integration that is configured with the entity's credentials (e.g., via an integrated data extraction software application). The missing data detection system 102 can obtain metadata or other information about the infrastructure or functions used by the entity and thereby populate attributes of the data objects with this information.

In additional aspects, the missing data detection system 102 communicates with the client device 106 to obtain information associated with the data objects or to provide information about the data objects for display within the client application 112. For instance, the missing data detection system 102 can obtain, via user input received from an administrator client device, metadata or other information about the infrastructure or functions used by the entity and thereby populate attributes of the data objects with this information. Furthermore, the missing data detection system 102 can receive inputs from the client device 106 to generate or modify a graph-based taxonomy and/or perform operations at one or more computing systems associated with the graph-based taxonomy. The missing data detection system 102 can also utilize information generated in connection with detecting missing data to generate messages and notifications to provide for display at the client device 106.

In one or more aspects, the third-party computing system 108 includes a server device, an individual client device, or another computing device associated with an entity. For instance, the third-party computing system 108 includes one or more computing devices for performing a data process involving handling data associated with one or more operations of the entity subject to a particular data policy. To illustrate, the third-party computing system includes one or more server devices that generate, process, store, or transmit payment card processing data subject to PCI DSS in one or more jurisdictions and are therefore covered by one or more corresponding data policies.

In one or more aspects, the server device(s) 104 include a variety of computing devices, including those described below with reference to FIG. 11. For example, the server device(s) 104 includes one or more servers for storing and processing data associated with one or more data processes. In some aspects, the server device(s) 104 also include a plurality of computing devices in communication with each other, such as in a distributed storage environment. In some aspects, the server device(s) 104 include a content server. The server device(s) 104 also optionally includes an application server, a communication server, a web-hosting server, a social networking server, a digital content campaign server, or a digital communication management server.

In one or more aspects, the client device 106 includes, but is not limited to, a desktop, a mobile device (e.g., smartphone or tablet), or a laptop including those explained below with reference to FIG. 11. Furthermore, although not shown in FIG. 1, the client device 106 can be operated by users (e.g., a user included in, or associated with, the system environment 100) to perform a variety of functions. In particular, the client device 106 performs functions such as, but not limited to, accessing, viewing, and interacting with data associated with data processes associated with one or more data policies. In some aspects, the client device 106 also performs functions for generating, capturing, or accessing data to provide to the missing data detection system 102 in connection with detecting missing data. For example, the client device 106 communicates with the server device(s) 104 via the network 110 to provide information (e.g., user interactions) associated with data processes. Although FIG. 1 illustrates the system environment 100 with a single client device, in some aspects, the system environment 100 includes a plurality of client devices.

Additionally, as shown in FIG. 1, the system environment 100 includes the network 110. The network 110 enables communication between components of the system environment 100. In one or more aspects, the network 110 may include the Internet or World Wide Web. Additionally, the network 110 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104, the client device 106, and the third-party system communicate via the network using one or more communication platforms and technologies suitable for transporting data and/or communication signals, including any known communication technologies, devices, media, and protocols supportive of data communications, examples of which are described with reference to FIG. 11.

Although FIG. 1 illustrates the server device(s) 104, the client device 106, and the third-party computing system 108 communicating via the network 110, in additional or alternative aspects, the various components of the system environment 100 communicate and/or interact via other methods (e.g., the server device(s) 104, the client device 106, and/or the third-party computing system 108 can communicate directly). Furthermore, in some aspects, the missing data detection system 102 includes the digital data repository 114 in connection with data processes of the third-party computing system 108. In additional aspects, the client device 106 or another device includes the digital data repository 114.

In some aspects, the server device(s) 104 support the missing data detection system 102 on the client device 106. For instance, the server device(s) 104 generates/maintains the missing data detection system 102 and/or one or more components of the missing data detection system 102 for the client device 106. The server device(s) 104 provides the missing data detection system 102 to the client device 106 (e.g., as part of a software application/suite). In other words, the client device 106 obtains (e.g., downloads) the missing data detection system 102 from the server device(s) 104. At this point, the client device 106 is able to utilize the missing data detection system 102 to manage compliance of data processes according to one or more data policies and/or detect missing data independently from the server device(s) 104.

In additional or alternative aspects, the missing data detection system 102 includes a web hosting application that allows the client device 106 to interact with content and data processes hosted on the server device(s) 104. To illustrate, in one or more aspects, the client device 106 accesses a web page supported by the server device(s) 104. The client device 106 provides input to the server device(s) 104 to perform missing data detection or compliance management operations, and in response, the missing data detection system 102 on the server device(s) 104 performs operations to view/manage data associated with detected missing data. The server device(s) 104 provide the output or results of the operations to the client device 106.

Figure 2:
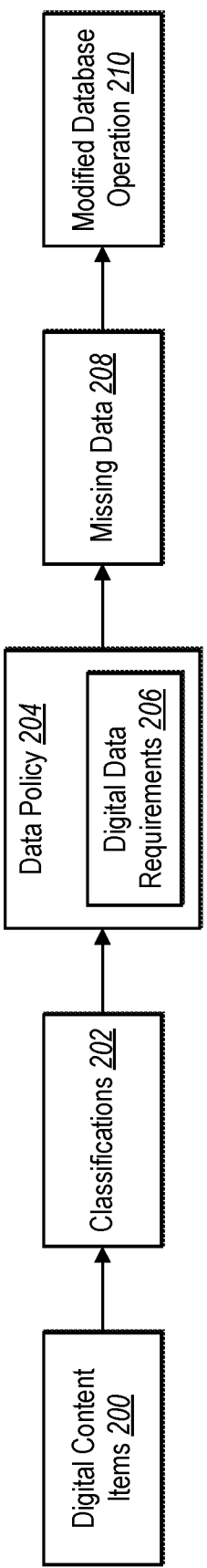
FIG. 2 illustrates an example of an overview of the missing data detection system detecting missing data from digital content items in connection with a data policy in accordance with one or more aspects.

As mentioned, the missing data detection system 102 automatically detects missing data in a digital data repository in connection with one or more data policies. FIG. 2 illustrates an example of the missing data detection system 102 determining categories in digital content items for use in determining that the digital content items are missing certain data in relation to a data policy. Additionally, FIG. 2 illustrates that the missing data detection system 102 utilizes the detected missing data to determine and modify a database operation associated with the digital content item.

In one or more aspects, the missing data detection system 102 accesses digital content items 200 from a digital data repository. For example, the digital content items 200 can include digital text documents, digital image files, digital video files, digital audio files, or digital files including a combination of various types of media. Additionally, the digital content items 200 can include data generated or collected in connection with various data processes for an entity. To illustrate, the missing data detection system 102 determines the digital content items 200 stored at the digital data repository in connection with a third-party computing system providing various computing services to one or more additional entities.

According to one or more aspects, the missing data detection system 102 generates classifications 202 of the digital content items 200. In particular, the missing data detection system 102 utilizes a classifier model with one or more pre-trained classifiers to determine specific classifications (e.g., categories) of the digital content items 200. For instance, the missing data detection system 102 utilizes the classifier model to generate the classifications 202 based on attributes of the digital content items. To illustrate, the missing data detection system 102 generates the classifications 202 based on data elements (e.g., contents) of the digital content items 200, metadata of the digital content items, data types of the digital content items, or other context associated with the digital content items 200.

As used herein, the term "classifier model" refers to one or more computer functions that classify digital data into various categories. For example, a classifier model processes data elements and outputs a classification for each data element according to a classification scheme. In some instances, the classifier model includes a machine-learning model or neural network that learns to classify data into a set of categories based on features, characteristics, or other attributes of the data element. In some instances, the classifier model can classify data by utilizing one or more classifiers that match data elements to classifier labels. In some cases, a classifier model can apply a set of classifiers to data elements in a data set in a specific sequence.

In some aspects, a classifier can include one or more discovery patterns. As used herein, the term "discovery pattern" refers to a method for evaluating data samples for certain features, characteristics, and/or attributes of a data element and/or digital dataset. For example, a data type discovery pattern can search for regularly used data formats (e.g., Text, Number, DateTime). In some aspects, discovery patterns include, but are not limited to, date, digital checks (e.g., a form for validating numbers and reducing false positives), length check (identifying a range of values or a specific character count), lookup (e.g., finding a specific phrase or term that matches the classifier), or regex (a regular expression value that aligns with a desired search pattern). To illustrate, a digital check discovery pattern could verify that a detected sequence of numbers is a Denmark Personal Identification Number by applying a digital check where the first DIGIT_AT is multiplied by 1 (e.g., 4×1), the next DIGIT_AT is multiplied by 3 (e.g., 3×2), and so on.

Furthermore, in one or more aspects, the missing data detection system 102 determines that the digital content items 200 correspond to a data policy 204. For example, the missing data detection system 102 generates mappings between the digital content items 200 and the data policy 204 based on the classifications 202 of the digital content items 200. In some aspects, the missing data detection system 102 generates the mappings based on predetermined mappings of classifications to the data policy 204. To illustrate, the missing data detection system 102 can determine that the digital content items 200 correspond to the data policy 204 in response to determining that the classifications 202 indicate that the digital content items 200 include PII or other sensitive data. Alternatively, the missing data detection system 102 determines that the digital content items 200 are related to one or more data policies in response to a selection of the data policies via a client device associated with an entity.

Additionally, as illustrated in FIG. 2, the data policy 204 includes digital data requirements 206. Specifically, the digital data requirements 206 include requirements of specific controls to be implemented with the digital content items 200 based on the association of the data policy 204 with the digital content items 200. For example, the missing data detection system 102 determines that the classifications 202 of the digital content items 200 indicate that the digital content items 200 are (or should be) covered under one or more controls described or defined by the digital data requirements 206. To illustrate, the missing data detection system 102 can determine that the classifications 202 indicate that the digital content items 200 should include specific data types, linked to specific data types, encrypted via a specific encryption, etc., as indicated by the digital data requirements 206.

In response to determining that the digital content items 200 correspond to the digital data requirements 206, the missing data detection system 102 detects missing data 208 from the digital content items 200. To illustrate, the missing data detection system 102 determines that the digital data requirements 206 indicate specific data or a specific type of data that should be included with the digital content items 200. In response to determining, based on the classifications 202, that the specific data or specific data type is not included with the digital content items 200, the missing data detection system 102 determines the missing data 208 (e.g., based on the lack of such data in the digital content items 200).

In additional aspects, the missing data detection system 102 also determines a cause of the missing data 208. For instance, the missing data detection system 102 can determine that the missing data 208 is a result of a particular database operation (or combination of database operations) at one or more computing devices. Accordingly, as illustrated in FIG. 2, the missing data detection system 102 determines a modified database operation 210 to correct the error resulting in the missing data 208. In some aspects, applying the modified database operation 210 prevents missing data in the future, such as by preventing certain functions or user accounts from deleting certain data types in the digital data repository. In additional or alternative aspects, applying the modified database operation 210 corrects the missing data 208 and generates or moves the missing data 208 to bring the digital content items 200 into compliance with the digital data requirements 206.

Figure 3:
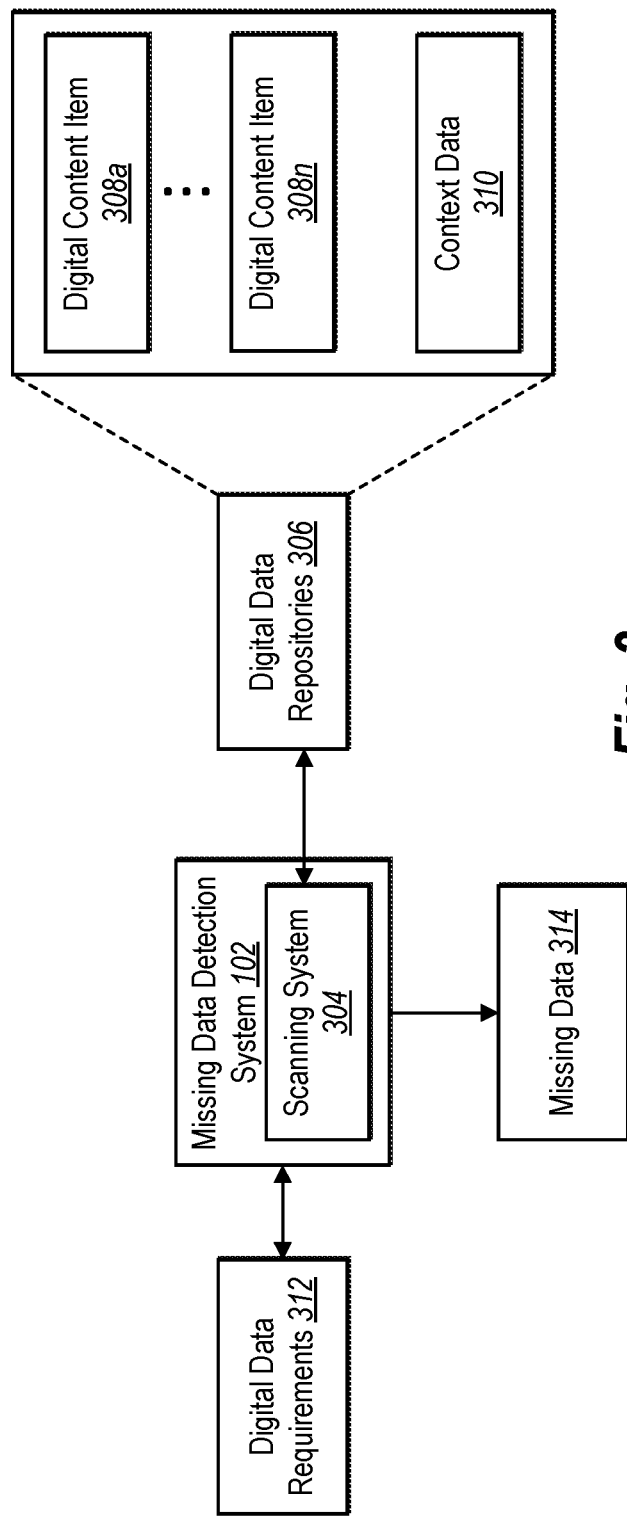
FIG. 3 illustrates an example of the missing data detection system detecting data missing from digital data repositories in accordance with one or more aspects.

FIG. 3 illustrates an additional example of the missing data detection system 102 determining missing data from digital content items in one or more digital data repositories. In particular, as illustrated, the missing data detection system 102 includes a scanning system 304 that integrates with digital data repositories 306 associated with a third-party computing system. For example, the digital data repositories 306 can include servers or other computing devices that store digital data for an entity. Accordingly, the missing data detection system 102 can utilize the scanning system 304 to integrate with the digital data repositories 306 via an application programming interface or a software application installed at the digital data repositories 306 to access data stored at the digital data repositories 306.

Additionally, in one or more aspects, the digital data repositories 306 include data for executing one or more data processes (e.g., executables, scripts, or input data), results from one or more data processes (e.g., output data), data representing hard copies of data (e.g., digital scans), or other data associated with operations of an entity. Accordingly, the digital data repositories 306 include digital content items 308a-308n including digital files corresponding to the various data processes or other operations of the entity. In one or more aspects, the digital data repositories 306 also include context data 310 associated with the digital content items 308a-308n.

In one or more aspects, the context data 310 includes additional digital content items (e.g., files, metadata) that provide context for the compliance of the digital content items 308a-308n with digital data requirements 312 of one or more data policies. To illustrate, the missing data detection system 102 can determine tables or other datasets including information that indicates whether the digital content items 308a-308n include required data indicated by the digital data requirements 312. Accordingly, the missing data detection system 102 can utilize the digital data requirements 312 to determine whether the digital content items 308a-308n meets one or more data type requirements, thresholds, etc., according to the context data 310.

As an example, the context data 310 can include a list of employees, users, devices, or components of a data process that uses the digital content items 308a-308n. In response to determining that the digital content items 308a-308n correspond to the digital data requirements 312 (e.g., based on classifications of the digital content items 308a-308n), the missing data detection system 102 can determine that the digital data repositories 306 do not have one or more data types required by the digital data requirements 312 by comparing the digital content items 308a-308n (or elements of the digital content items 308a-308n) to the context data 310. To illustrate, in response to determining that the digital data requirements 312 require that employee data stored at the digital data repositories 306 includes contact information or specific identifying information for employees, the missing data detection system 102 can compare one or more digital content items in the digital data repositories 306 to an employee list identified in the context data 310. In an additional example, the missing data detection system 102 can determine that the context data 310 includes a list of client devices involved in a data process. The missing data detection system 102 can determine whether the digital content items 308a-308n includes encrypted data for each of the client devices indicated in the context data 310 as required by the digital data requirements 312.

In response to determining that the digital content items 308a-308n do not include one or more specific instances or types of data indicated by the digital data requirements 312, the missing data detection system 102 determines missing data 314. Specifically, the missing data detection system 102 determines that the missing data 314 corresponds to one or more digital content items or data elements in one or more digital content items that are missing/not present in the digital data repositories 306 as required by the digital data requirements 312. For instance, the missing data detection system 102 can determine, based on a comparison (or other computational logic) of the digital content items 308a-308n and the context data 310 to the digital data requirements 312, that the digital data repositories 306 do not include a specific file, file type, encrypted file, etc., in connection with the digital data requirements 312. In one or more aspects, the missing data detection system 102 determines related data elements mapped to a set of digital data requirements and, in response to determining that the related data elements are stored in a digital data repository, the missing data detection system 102 can determine that the related data elements do not include a specific subset of data elements.

In one or more aspects, related data elements are digital content items or data types that are associated with each other in connection with a particular classification. For example, related data elements can include a first data type that is always or typically (e.g., based on a threshold percentage of a dataset) paired with a second data type in connection with a particular classification of data elements. To illustrate, the missing data detection system 102 extracts data elements labeled "employee name" and "employee start date" from a dataset. In connection with classifying the extracted data as belonging to an "employee data" class, the missing data detection system 102 can also determine that "employee data" typically stores related data elements including: employee name, employee start date, and resume (e.g., based on historical data or a predetermined mappings of data elements to classifications). Accordingly, the missing data detection system 102 can determine that the dataset is missing a "resume" data element based on finding the related data elements "employee name" and "employee start date."

In additional aspects, the missing data detection system 102 detects the missing data 314 in connection with one or more records associated with a dataset. For example, the digital data repositories 306 can include write records that store a history of write actions made to the digital data repositories 306 or to a portion of the digital data repositories 306 (e.g., in a database table associated with a particular data asset). Specifically, a write record can include a plurality of digital content items or other data elements stored in the digital data repositories 306 for a period of time. The missing data detection system 102 can scan the write record—such as by executing one or more database search operations to search one or more rows, columns, and/or cell entries in a database table—to determine whether a particular data element was stored in the digital data repositories 306 in connection with the digital data requirements 312. In response to determining that the write record does not include the data element, the missing data detection system 102 can determine that the missing data 314 includes the data element.

Alternatively, in response to determining that the write record includes a particular data element associated with the digital data requirements 312, the missing data detection system 102 can scan the digital data repositories 306 for the data element. The missing data detection system 102 can verify whether the digital data repositories 306 include the particular data element corresponding to the write record. If the missing data detection system 102 does not find the data element indicated by the write record, the missing data detection system 102 can determine that the missing data 314 includes the data element and that the write record is incorrect.

Figure 4:
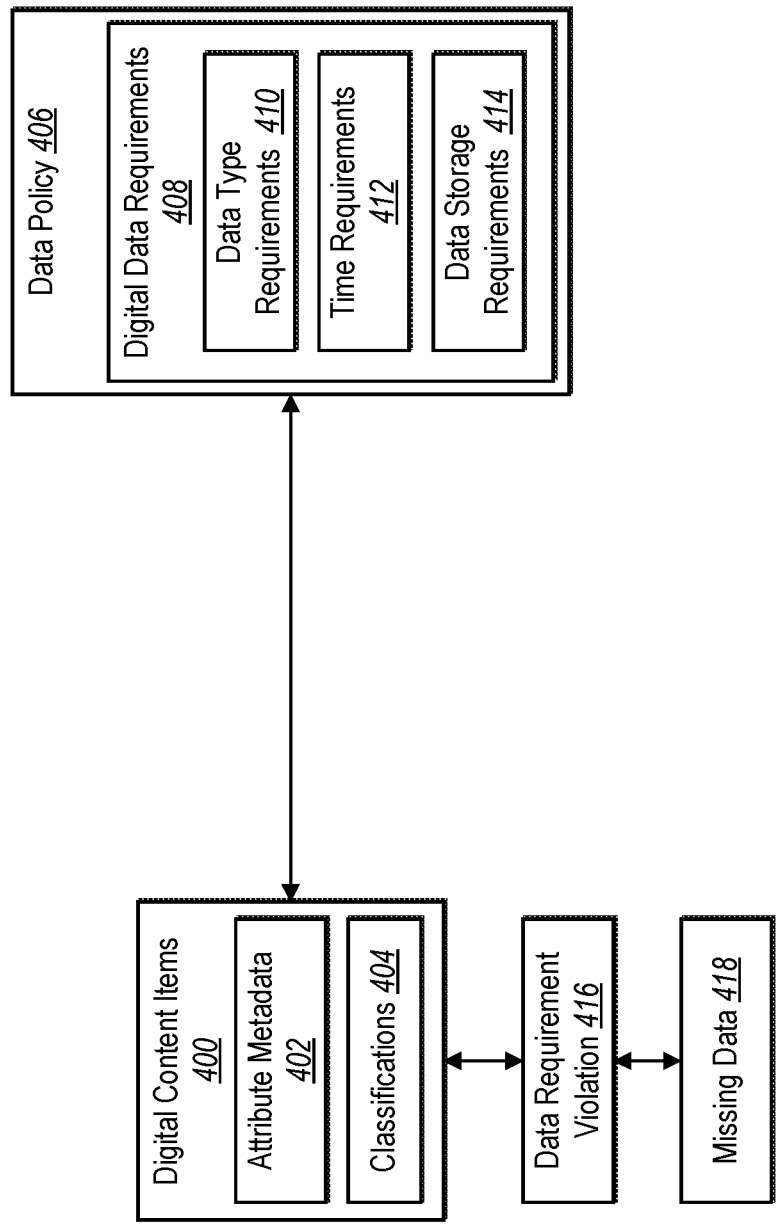
FIG. 4 illustrates an example of the missing data detection system determining that various digital data requirements indicate missing data in digital content items in accordance with one or more aspects.

In one or more aspects, as illustrated by FIG. 4, the missing data detection system 102 can determine missing data in violation of one or more requirements of a data policy. In particular, FIG. 4 illustrates that the missing data detection system 102 utilizes a comparison logic to determine whether digital content items 400 conform to various requirements of a data policy 406. In one or more aspects, the missing data detection system 102 determines attribute metadata 402 associated with the digital content items 400 including information about various characteristics of the digital content items 400. To illustrate, the missing data detection system 102 determines data types of the digital content items 400, element types (e.g., text, images) of individual elements in the digital content items 400, file sizes of the digital content items 400, encryption of the digital content items 400, or other attributes of the digital content items 400.

In additional aspects, the missing data detection system 102 determines classifications 404 of the digital content items 400. Specifically, as mentioned, the missing data detection system 102 generates classifications of the digital content items 400 utilizing a classifier model with a plurality of pre-trained classifiers. For example, the missing data detection system 102 determines the classifications 404 by classifying each digital content item. In additional examples, the missing data detection system 102 determines the classifications 404 by classifying individual data elements of each digital content item. Accordingly, the classifications 404 can include a plurality of levels of classification for individual data elements within the digital content items 400 as well as for the digital content items 400 themselves (e.g., an individual data element corresponds to a first category and the data element with one or more other data elements corresponds to a second category). Furthermore, in some aspects, the missing data detection system 102 generates the classifications 404 to include classifications of groups (e.g., directories) of digital content items.

In one or more aspects, the missing data detection system 102 utilizes the attribute metadata 402 and the classifications 404 of the digital content items 400 to determine whether the digital content items 400 comply with the data policy 406 according to digital data requirements 408 of the data policy 406. In particular, the missing data detection system 102 can determine a set of digital data requirements including one or more data thresholds or comparisons. For instance, the missing data detection system 102 determines that the digital data requirements 408 include, but are not limited to, data type requirements 410, time requirements 412, and/or data storage requirements 414. The missing data detection system 102 can determine whether the digital content items 400 comply with individual data requirements or combinations/sets of data requirements.

In one or more aspects, the data type requirements 410 include one or more requirements about data types for the digital content item 400. To illustrate, the data type requirements 410 can indicate that the digital content items 400 include a specific data type (e.g., a specific file type, a specific class of data, a specific combination of data elements) in connection with the digital content items 400 being associated with the data policy 406. In an additional example, in response to the digital content items 400 including a first data type (e.g., first classification), the data type requirements 410 can indicate that the digital content items 400 should also include a second data type (e.g., second classification). Alternatively, the data type requirements 410 can indicate that the digital content items 400 should include a first data type if the digital content items 400 do not include a second data type. Thus, the digital data requirements 408 can include requirements for the digital content items 400 to include one or more specific data types.

In some aspects, the time requirements 412 include one or more requirements related to timestamps of the digital content item 400. For instance, the time requirements 412 can include requirements that one or more digital content items or data types be stored for at least a threshold amount of time. Alternatively, the time requirements 412 can include requirements that one or more digital content items or data types not be stored longer than a threshold amount of time.

In one or more aspects, the data storage requirements 414 include one or more requirements that one or more digital content items be stored at a particular location. For example, the data storage requirements 414 can include one or more requirements that a particular data type (e.g., financial information, PII) be stored in a particular storage location separate from one or more other data types. In another example, the data storage requirements 414 can include one or more requirements that a particular data type be encrypted or stored in an encrypted storage location.

In one or more aspects, the missing data detection system 102 determines a data requirement violation 416 in response to a comparison of the digital content items 400 in connection with the digital data requirements 408. Specifically, the missing data detection system 102 determines that the digital content items 400 do not meet one or more of the data type requirements 410, the time requirements 412, or the data storage requirements 414. For instance, the missing data detection system 102 can determine, based on the attribute metadata 402 and/or the classifications 404, the digital content items 400 are missing one or more data types indicated by the data type requirements 410. In another example, the missing data detection system 102 determines that the digital content items 400 do not include data required to be stored for a specific amount of time. In an additional example, the missing data detection system 102 determines that the digital content items 400 do not include a specific data type at a particular storage location.

Accordingly, in connection with detecting the data requirement violation 416, the missing data detection system 102 can determine missing data 418. For instance, the missing data detection system 102 can determine that the missing data 418 includes a specific digital content item, a specific data type, a specific data element of one or more digital content items, etc. The missing data detection system 102 can accordingly determine any number of data requirement violations based on the digital data requirements 408.

Figure 5:
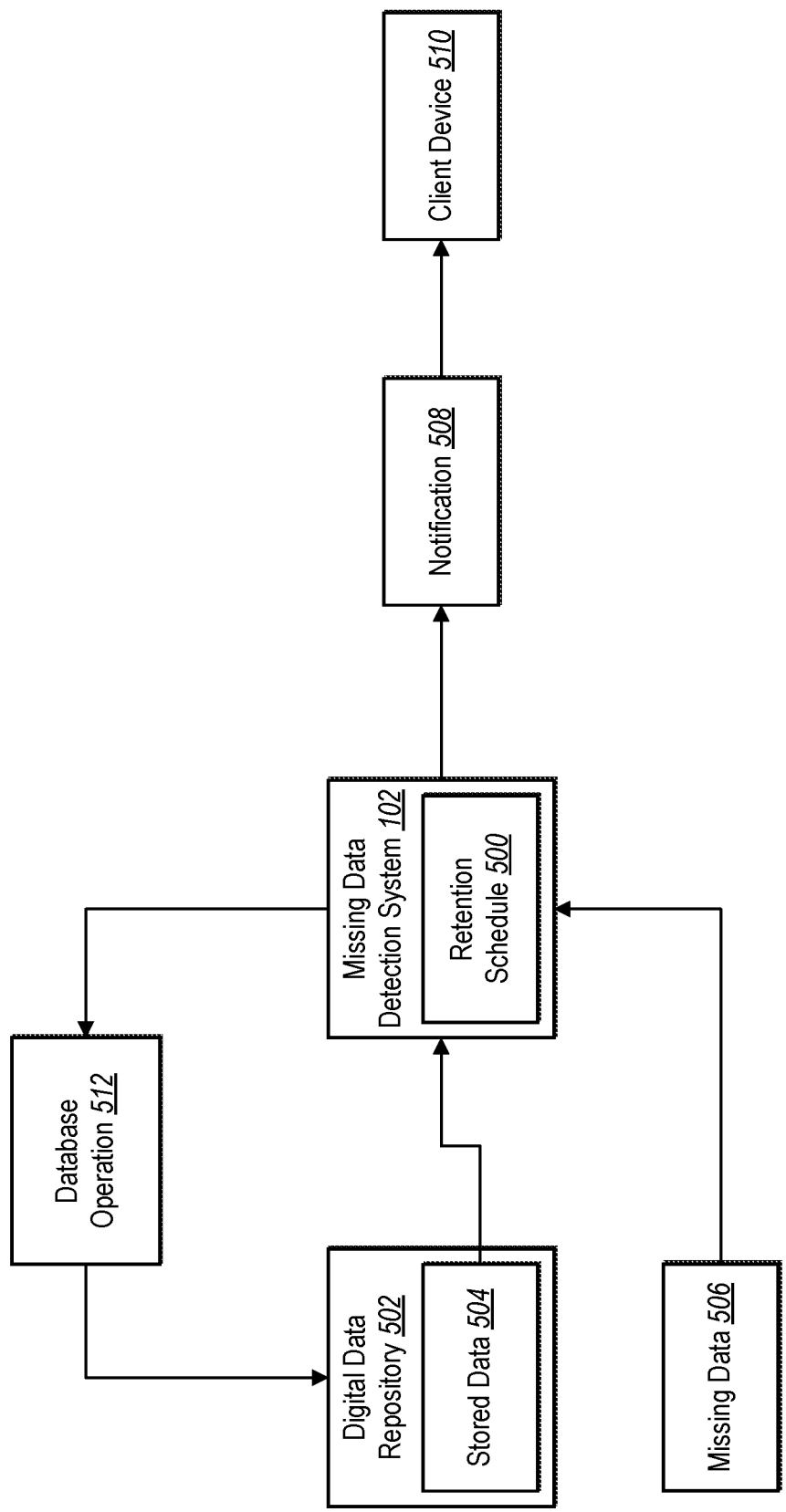
FIG. 5 illustrates an example of the missing data detection system generating a notification of missing data and modifying a database operation to correct missing data in accordance with one or more aspects.

In one or more aspects, the missing data detection system 102 performs missing data detection in a plurality of operations. For instance, the missing data detection system 102 can utilize a schedule that routinely checks for missing data in a digital data repository. FIG. 5 illustrates that the missing data detection system 102 utilizes a retention schedule 500 to perform one or more operations to detect data missing from a storage location in connection with one or more data policies. Additionally, FIG. 5 illustrates that the missing data detection system 102 can communicate with a plurality of devices to detect missing data and notify of missing data.

For example, as illustrated in FIG. 5, the missing data detection system 102 determines a retention schedule 500 that indicates one or more time periods for scanning data in a digital data repository 502 to detect missing data. In particular, the missing data detection system 102 can automatically execute one or more extraction, scanning, classification, and data detection operations in connection with the retention schedule 500 to detect whether data is missing in relation to digital data requirements of one or more data policies. For example, the missing data detection system 102 can determine that the retention schedule 500 indicates specific dates, days, and/or times (e.g., in a recurring schedule) to perform missing data detection operations at the digital data repository 502.

In one or more aspects, the missing data detection system 102 scans and processes stored data 504 at the digital data repository 502 according to the retention schedule 500. In connection with scanning and processing the stored data 504, the missing data detection system 102 detects missing data 506 relative to the digital data repository 502. In response to detecting the missing data 506, the missing data detection system 102 can generate a notification 508 including information about the missing data 506 to provide to a client device 510. For example, the missing data detection system 102 can generate a recommendation of an action to provide with the notification 508 to the client device 510 to correct issues resulting in the missing data 506. Accordingly, the missing data detection system 102 can detect the missing data 506 and send the notification 508 of the missing data 506 to the client device 510 according to the retention schedule 500.

Furthermore, in one or more aspects, the missing data detection system 102 can perform one or more modifications to a database operation 512 in response to detecting the missing data 506. Specifically, the missing data detection system 102 can determine a cause of the missing data 506 by determining one or more computing devices including software that accesses and/or modifies the stored data 504 at the digital data repository 502. For instance, the missing data detection system 102 can determine that a particular function of a software application accesses the stored data 504 to perform one or more deletion operations at the digital data repository 502 to delete a particular data type, data element, etc., corresponding to the missing data 506. Accordingly, the missing data detection system 102 can modify (or generate a recommendation to modify) the database operation 512 corresponding to the function that performs the deletion operation(s) in response to detecting the missing data 506. In another example, the missing data detection system 102 modifies a database operation corresponding to a function that updates digital content items, moves digital content items, creates backups of digital content items, or other functions that can result in the missing data 506.

According to one or more aspects, the missing data detection system 102 modifies the database operation 512 via an integration with one or more computing devices that includes or accesses a software application or function corresponding to the database operation 512. For example, the missing data detection system 102 can generate and send instructions to the one or more computing devices to cause the one or more computing devices to update the database operation 512 (e.g., by changing one or more lines of code). In some aspects, the missing data detection system 102 can provide an option with the notification 508 to implement one or more changes to the database operation 512. The missing data detection system 102 can execute the option to modify the changes to the database operation 512 in response to a request from the client device 510 (e.g., by communicating with the computing devices with access to the digital data repository 502). Additionally, in some aspects, the missing data detection system 102 includes the software application with the database operation 512 and thus can automatically implement modifications to the database operation 512 in response to detecting the missing data 506.

Figure 6:
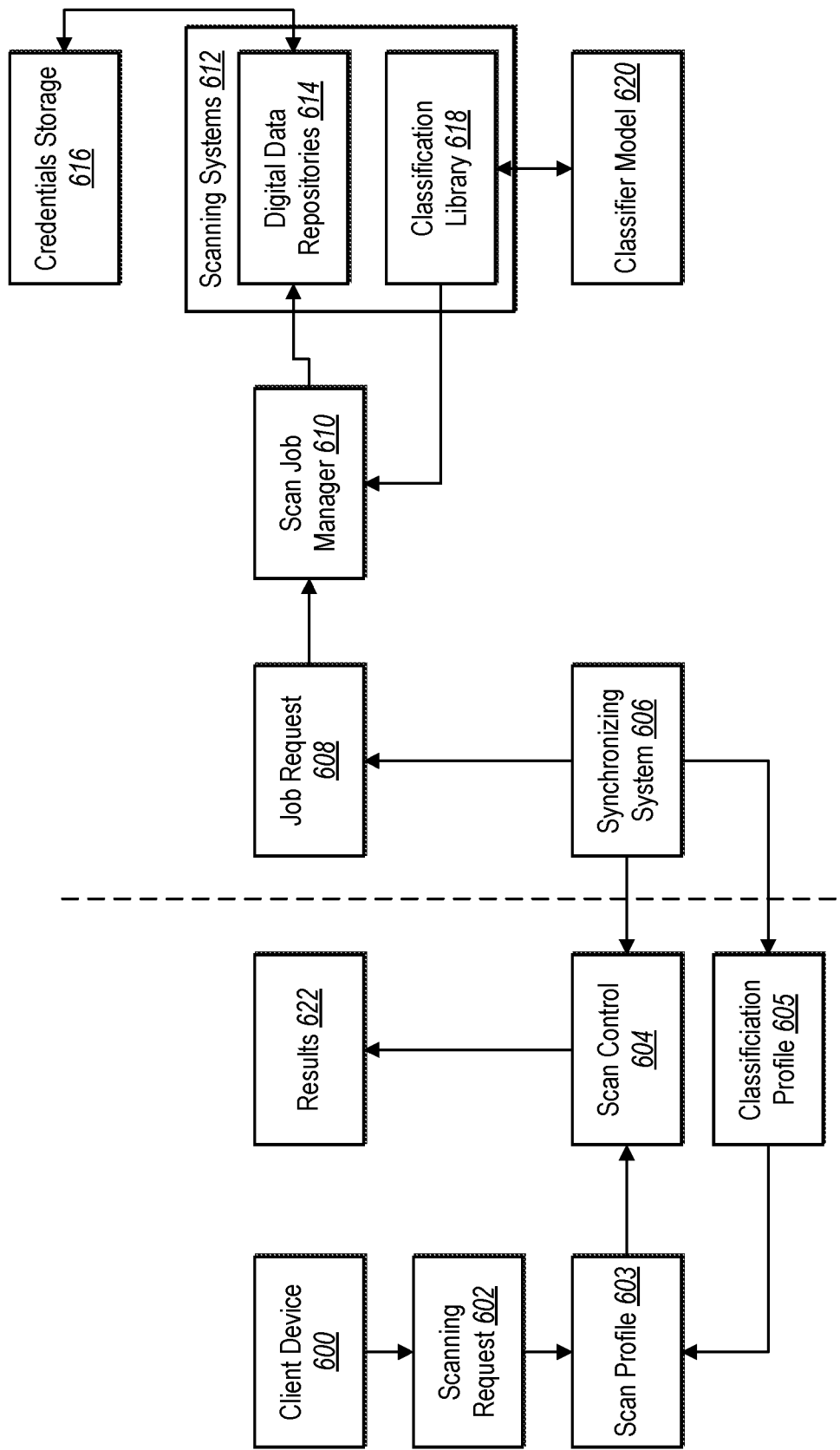
FIG. 6 illustrates examples of a system architecture of a missing data detection system in accordance with one or more aspects.

FIG. 6 illustrates an example architecture of the missing data detection system 102 performing operations to detect missing data in stored data associated with an entity. In one or more aspects, as illustrated, a first portion of the missing data detection system 102 operates at a cloud-based computing system. Additionally, a second portion of the missing data detection system 102 operates on premises (e.g., on one or more computing devices or servers associated with an entity).

In one or more aspects, the missing data detection system 102 includes (or communicates with) a client device 600 that initiates a scanning request 602 to scan a dataset including a plurality of digital content items. For example, the missing data detection system 102 can determine that the scanning request 602 indicates one or more instructions for scanning the dataset (e.g., based on a scan profile 603). To illustrate, the scan profile 603 indicates one or more data policies for analyzing a particular dataset, for example, as determined by a user indication of priority levels in a classification profile 605 or based on extracted priority levels corresponding to downstream operations. In connection with determining the scan profile 603 of the scanning request 602, the missing data detection system 102 provides the scan profile 603 to a scan control 604 that initiates the scanning request in connection with a portion of the missing data detection system 102 at computing devices of the entity.

In one or more aspects, the missing data detection system 102 provides a packet or message sent including the scanning request 602 (with the scan profile 603) to a synchronizing system 606 (e.g., via an API provided by the missing data detection system 102) and including processing instructions to perform one or more operations via one or more recipient processors and/or processing threads. For instance, a scanning request can include a request to extract data, modify data, or otherwise perform operations on data for digital data.

To illustrate, the missing data detection system 102 utilizes the scan control 604 to provide processing instructions to perform one or more operations associated with the scanning request 602 via one or more recipient processors and/or processing threads at the computing devices of the entity. For instance, the synchronizing system 606 can continuously poll the scan control 604 for new job requests. In some aspects, the synchronizing system 606 provides the classification profile 605 for including with the scan profile 603. As illustrated in FIG. 6, the missing data detection system 102 deploys the synchronizing system 606 (with additional components) at the computing device(s) of the entity behind network security controls (e.g., outside one or more firewalls) for accessing digital content items associated with the entity (e.g., at the computing devices or via one or more remote computing devices through the firewall(s)). For instance, in the example depicted in FIG. 1, the synchronizing system 606 (with additional components) could be installed on the third-party system 108 in order to have access to one or more digital data repositories (e.g., the digital data repository 114) within a computing environment managed or accessed via one or more client devices 106. In this example, the missing data detection system 102 includes the scan control 604 and the synchronizing system 606. The scan control 604, installed on a server device 104, can only communicate with the synchronizing system 606, installed on the third-party system 108, whereas the synchronizing system 606 (with additional components) can perform various scanning and classification actions described herein.

In one or more aspects, the missing data detection system 102 utilizes the synchronizing system 606 to compare a list of jobs included in a jobs table to determine one or more actions to take. For example, in response to determining that a scan job is present on the cloud-based system but not on the on-premises system, the synchronizing system 606 initiates a new job. In response to determining that a scan job is present on the on-premises system but not on the cloud-based system, the synchronizing system 606 cancels the job on the on-premises system. If the synchronizing system 606 determines that a scan job is present on both systems, the synchronizing system 606 determines a status of the scan job (e.g., completed, failed, or timed-out) and sends a status notification to the scan control 604.

In one or more aspects, the missing data detection system 102 utilizes the synchronizing system 606 to submit a job request 608 to a scan job manager 610 that manages the initiation and execution of scan jobs at the computing device(s) of the entity. For example, the missing data detection system 102 utilizes the scan job manager 610 to communicate with scanning systems 612 that scan digital data repositories 614 including a dataset associated with the job request 608. In additional aspects, the scanning systems 612 include functions, scripts, or applications integrated with the digital data repositories 614 to access and/or modify digital content items in the dataset. To illustrate, the scanning systems 612 communicate with a database management system, a cloud storage device or local storage devices, and/or storage accounts (e.g., utilizing credentials in a credentials storage 616) to access digital content items. In some embodiments, a listing of jobs received from the scan control 604 can include job contexts for each scan job, including a scan profile identifier, a base label version (e.g., version of label definitions for pre-seeded labels available to all clients), and a custom label version (e.g., version of label definitions for custom labels specific to the entity).

In one or more embodiments, the missing data detection system 102 executes a scan job through a pipeline of initiation, distribution, extraction and classification implemented by the scanning systems 612 on the on-premises system, in which various events are emitted at different stages. Events can include examples such as those in the table below.

---

JOB_DISTRIBUTION_STARTED
JOB_CANCELLED
INCREMENT_JOB_SIZE
JOB_DISTRIBUTION_COMPLETED
JOB_DISTRIBUTION_FAILED
TASK_STARTED
UPDATE_TASK_SIZE
INCREMENT_PROCESSED_SIZE
TASK_COMPLETED
TASK_FAILED
TASK_CANCELLED

---

The scan job manager 610 can subscribe to the events and manage the lifecycle of the jobs/tasks based on those events. Additionally, scanning systems 612 can emit events upon completion of a particular phase of the scan job in a pipeline. In some aspects, the scan job manager 610 updates a jobs repository to indicate which of these events have been emitted for a given scan job.

Furthermore, as illustrated, the scanning systems 612 include a classification library 618 that communicates with a classification model 620 (e.g., a named entity recognition model or other natural language processing model) to determine classifications associated with the digital content items. In one or more aspects, the classification library 618 also communicates with the scan job manager 610 to obtain label definitions for labeling digital content items based on classifications generated by the classification model 620. Additionally, the classification library 618 can determine the label definitions according to information from the classification profile 605 and/or the scan profile 603.

In one or more embodiments, in a scan job, a portion of the missing data detection system 102 implemented on-premises can apply one or more of the classifiers to batches of test data extracted by the scanning systems 612. For example, the batch sizes can be based on a predefined batch size or a user-defined batch size. To illustrate, a configuration setting in the scan profile 603 can indicate a specific number to sample and classify before initiating a sampling and/or classification of additional rows.

According to one or more aspects, in response to executing the job request 608 utilizing the scanning systems 612, the missing data detection system 102 utilizes the scanning systems 612 to communicate results data to the synchronizing system 606. For example the scanning systems 612 can provide a catalog and classification results corresponding to the digital content items indicated in the job request 608 to the synchronizing system 606. Additionally, as illustrated, the synchronizing system 606 can provide the catalog and classification results to the scan control 604, which provides results 622 (e.g., including indications of missing data) for display and analysis via one or more client devices (e.g., the client device 600). In one or more aspects, the missing data detection system 102 detects the missing data at the computing devices of the entity (e.g., at the scan job manager 610) or at the cloud-based computing device (e.g., at the scan control 604).

In one or more embodiments, the missing data detection system 102 provides the results 622 in connection with one or more downstream operations. The downstream operations can involve one or more computing devices (e.g., the client device 600 or another device/system) performing operations to locate specific data types within the digital data repositories 614, manage data from the digital data repositories 614 via automated workflows, control access to data within the digital data repositories 614, and/or facilitate deletion of data from the digital data repositories 614. To illustrate, the missing data detection system 102 can detect a new type of data (e.g., personal data or sensitive data) stored in a particular data source, which triggers an automated workflow via a software platform that includes or has access to the digital data repositories 614. The automated workflow can include a series of user interfaces that are dynamically selected, generated, organized, or otherwise configured based on the subject matter of the workflow.

An example of the workflow includes a guided assessment (e.g., via one or more software modules of the platform) in which a series of user interfaces for collecting information (e.g., information regarding one or more of the data source, the discovered data, the use of the discovered data, etc.) are displayed to a user. The missing data detection system 102 (or another system) can dynamically select, configure, and organize the series of interfaces based on the subject matter of the assessment (e.g., selecting interfaces presenting questions related to assessing privacy issues for certain discovered data types) and the data received via various interfaces in the workflow (e.g., skipping a question that is deemed no longer relevant based on an answer to an earlier question by omitting an interface that would present the irrelevant question).

In one or more aspects, the missing data detection system 102 (or another system) can utilize a guided assessment to determine a sensitivity of a newly discovered data type, identify risks associated with the new data type, or develop a plan to manage risks associated with the new data type. Furthermore, the system may utilize the automated workflow to notify appropriate users of the new data type, implement appropriate security controls to protect the new data type, or monitor the new data type for potential security/privacy risks. Accordingly, the missing data detection system 102 can execute an assessment in response to one or more user inputs or automatically in response to detecting a data type in a particular source and execute an automated workflow to perform one or more computing operations based on the assessment and/or otherwise in connection with detecting the data type.

Additionally, or alternatively, the missing data detection system 102 determines data types stored in one or more data sources and uses the determined data types to implement purpose-based access controls. For instance, the missing data detection system 102 can determine that access to certain data (e.g., web form data) may be subject to a particular purpose for accessing the data. To illustrate, a storage computing system may receive a request for credit card data or other financial data stored on the storage computing system to use in processing a purchase for a first data subject via a website.

In an additional example, the storage computing system may receive a second request for credit card data to use in displaying to a second data subject on the website to remind the second data subject of the credit card data previously saved to use in purchases (e.g., in a cookie). In such an example, the credit card data (e.g., entire credit card number) may not necessarily be needed for display to the second data subject, while a portion of the credit card data (e.g., a partially obfuscated or modified credit card number) may be sufficient for identification by the data subject. Therefore, the storage computing system may determine specific access controls for the credit card data based on the different purposes associated with the requests for the credit card data. Such access controls may not only be applicable with respect to the entity requesting access to the data, but may also be applicable to how the data is displayed (e.g., modified) or used once accessed by the entity.

In either case, improved methods for classifying data contained in a storage system (i.e., determining that data source X includes credit card data) by the missing data detection system 102 facilitates the application of access-control policies (e.g., which implement certain purpose restrictions) that selectively modify datasets returned in response to a query so that the datasets are compliant with the purpose restrictions implemented via the access-control policies. For instance, a user of the computing environment that includes the data sources may have an account with a certain role that is assigned certain permissions. The permissions may allow access to certain types of data in certain types of data source for certain purposes associated with the role. Thus, the missing data detection system 102 facilitates purpose-based access control to data based on the classification applied to the data. This ensures that the personal data is only accessed by authorized users (e.g., user accounts) for authorized purposes.

Additionally or alternatively, the missing data detection system 102 assists in the automated detection and remediation of data retention policies. For example, the missing data detection system 102 detects a certain type of data stored in a data source, such as personal data or other data considered sensitive for legal, regulatory, or policy reasons. The missing data detection system 102 also detects one or more dates associated with the data (e.g., data of a document's creation, date contained within a document, etc.). The combination of the determined type of data plus other criteria, such as the date, indicates that retention of the data constitutes a policy violation, such as a data retention policy. A software program or suite that includes the missing data detection system 102 or that communicates with the missing data detection system 102 (e.g., via an integration between the software program and the missing data detection system 102) can automatically delete (or automatically prompt a user to delete) the data that violates the policy.

For example, the missing data detection system 102 may determine that a data source is missing data associated with a particular classification of data. A software program that has access to the missing data detection system 102 (e.g., via an integration between the software program and a SaaS platform hosting the missing data detection system 102) may automatically modify a data process (e.g., one or more scripts, libraries, or executables) that accesses the data source to prevent deletion or modification of data associated with the classification of data, as it is required to be retained under the organization's data retention policy. The data process modification may be automated (e.g., without requiring any user intervention) via the missing data detection system 102 or partially automated (e.g., by presenting a user with a prompt or screen identifying the data process and proceeding with the modification upon receiving the user's confirmation).

Although FIG. 6 illustrates that the missing data detection system 102 utilizes a plurality of components within a cloud-based system and a plurality of components at on premises devices of a single entity, the missing data detection system 102 can implement data prioritization scanning for a plurality of entities. To illustrate, the missing data detection system 102 can integrate separate synchronizing systems, scan job managers, and scanning systems at computing devices of each entity that issues a scanning request to the components within the cloud-based system. For instance, the missing data detection system 102 can utilize the scan control 604 to manage scanning requests for a plurality of entities and communicate with a plurality of separate synchronizing systems at different computing devices of the different entities.

Additionally, as mentioned above, the missing data detection system 102 can utilize a first set of operations to manage the scan control 604 for implementing the scanning request 602 and providing the results 622 of the scanning request via the client device 600 at a first computing system (e.g., a cloud-based computing system). Additionally, the missing data detection system 102 can utilize a second set of operations to manage the synchronizing system 606, the scan job manager 610, and scanning systems 612 to scan data in digital data repositories 614 and classify the data utilizing a classification model 620 at a second computing system (e.g., one or more computing devices or servers at one or more locations of an entity). In some aspects, the missing data detection system 102 utilizes one or more other configurations, such that one or more portions described above in connection with the first computing system are instead part of the second computing system, or vice-versa. Thus, the missing data detection system 102 can utilize several different computing devices (e.g., cloud-based devices or on premises devices) to perform various operations associated with classifying and routing digital content items. In additional aspects, the missing data detection system 102 performs one or more operations described herein by utilizing one or more software applications at one or more computing devices to generate instructions that cause one or more additional computing devices to perform one or more computing operations. As an example, a cloud-based computing application classifies a digital content item by generating instructions that cause a server on premises of an entity to utilize a classification model to generate a classification for the digital content item.

In one or more aspects, the components deployed on the computing device(s) of the entity are part of a discovery agent for detecting data sources, datasets, and data types via data extraction and classification. The missing data detection system 102 can utilize the discovery agent to identify a data source, scan the data source, tag the data source (e.g., tag data in the data source), and send and classify the respective set of data in accordance with the tagged data. In some instances, by utilizing the discovery agent, the missing data detection system 102 generates metadata associated with the digital content items to indicate results of the scanning and classification by the discovery agent. Additionally, the discovery agent can include one or more virtual machines for storing data and/or including/executing scanning operations or classifying operations.

In additional aspects, the missing data detection system 102 configures the discovery agent to reduce an impact on a performance of the computing devices, servers, etc. For instance, the queue priority management system can configure the discovery agent to utilize bandwidth throttling techniques, such as by limiting scanning and other processing steps to non-peak times. The missing data detection system 102 can also configure the discovery agent to limit performance of such operations to backup applications and data storage locations (e.g., by using sampling techniques to decrease a number of files to scan during the data discovery process).

In additional aspects, the missing data detection system 102 generates data objects for each dataset or group of data in a digital data repository. For example, in response to determining that a particular set of data is a training dataset associated with a particular artificial intelligence model, the queue priority management system can generate a data object for the dataset. The missing data detection system 102 can also assign attributes to the data object based on attributes of the dataset. To illustrate, the missing data detection system 102 can store information with the data object indicating a purpose of the dataset, a priority level or data type of the dataset, or one or more other data components associated with the dataset (e.g., an artificial intelligence model). The missing data detection system 102 can also classify the data object associated with the dataset into a corresponding category (e.g., based on the priority level or data type).

Figure 7:
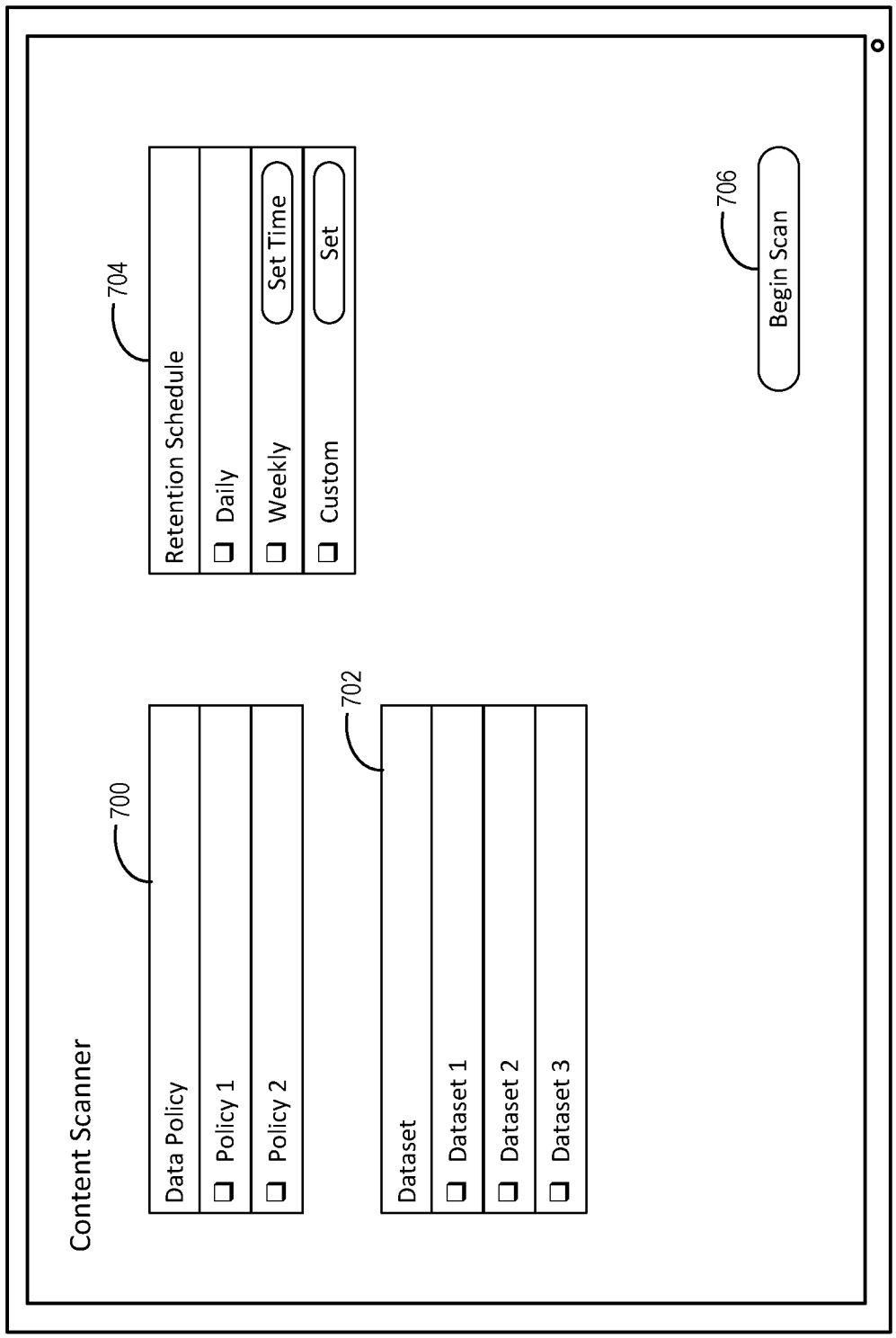
FIG. 7 illustrates an example of a graphical user interface for configuring a scanning operation to detect missing data in a digital data repository in accordance with one or more aspects.
Figure 9:
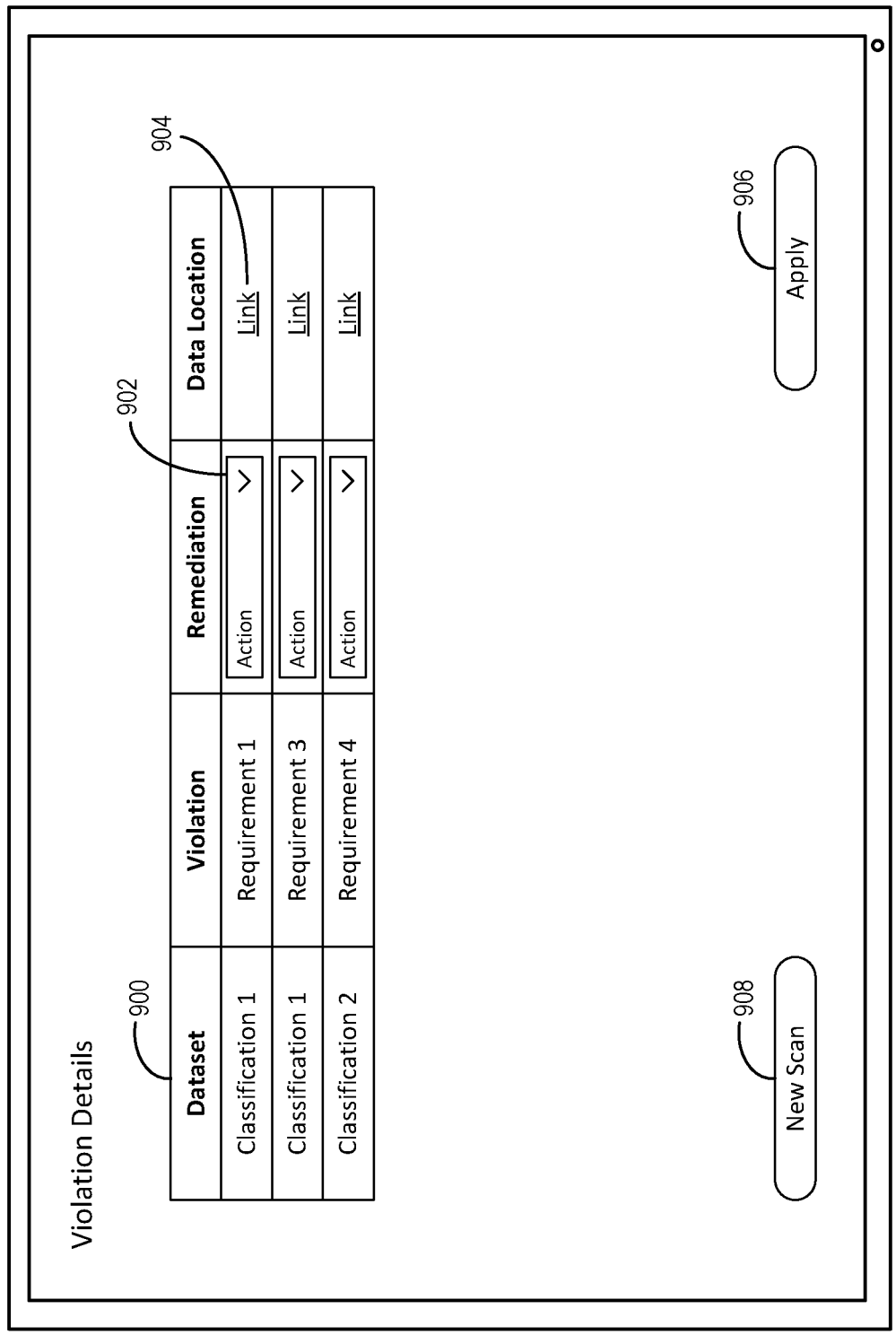
FIG. 9 illustrates an example of a graphical user interface displaying details associated with data missing from a digital data repository in violation of one or more digital data requirements in accordance with one or more aspects.

In one or more aspects, the missing data detection system 102 provides various tools for performing one or more operations associated with detecting missing data. In particular, FIGS. 7-9 illustrate graphical user interfaces for performing various operations associated with detecting missing data and correcting issues associated with the missing data. For example, FIG. 7 illustrates a graphical user interface of a client device for configuring a scanning operation to detecting missing data. FIG. 8 illustrates a graphical user interface of a client device for viewing results associated with a scanning operation to detect missing data. FIG. 9 illustrates a graphical user interface of a client device for viewing details of a specific data requirements violation for missing data and performing actions based on the violation.

As mentioned, FIG. 7 illustrates a client device displaying a graphical user interface for configuring a scanning request. Specifically, the client device displays a plurality of options for configuring a scanning operation to scan and classify digital content items from a digital data repository. For example, as illustrated, the client device displays tools to configure and initiate a scanning operation to analyze digital content items in one or more datasets in connection with one or more data policies.

To illustrate, the client device displays a policy section 700 including one or more data policies for determining specific digital data requirements. In one or more aspects, the client device can also display one or more options for customizing digital data requirements for the selected data policy (or policies). The client device can also display a dataset section 702 including one or more datasets to process in connection with the selected data policy. In one or more aspects, the missing data detection system 102 also provides a schedule section 704 to customize when and/or how often the missing data detection system 102 executes scanning requests according to the selected settings (e.g., daily, weekly, custom). Additionally, the missing data detection system 102 initiates a scan to detect missing data in the selected dataset(s) according to the digital data requirements of the data policy and the selected schedule, such as in response to a selection of a scan element 706.

In the various examples above, the missing data detection system 102 configures or otherwise causes the client device to perform the various display and/or population actions. In some aspects, software of the missing data detection system 102 executed on a server remote from the client device transmits instructions and/or data that cause the client device to provide the graphical user interface with the functionality described above. In additional or alternative aspects, software of the missing data detection system 102 executed on the client device configures the client device to provide the graphical user interface with the functionality described above with respect to FIG. 7.

FIG. 8 illustrates a client device displaying a graphical user interface for providing scan results of a scanning operation. For example, as shown, the client device displays a results section 800 including information about the scanning operation. To illustrate, the client device can display classifications of digital content items in the scanned dataset (s) according to the selected data policy (and their corresponding digital data requirements) associated with specific data types and data elements in the scanned content. Additionally, the scan results can include an indication of a priority level associated with a particular classified data type (e.g., high priority levels for first data types, medium priority levels for second data types, or low priority levels for third data types). Furthermore, the scan results can include a number of instances of specific data types found in the scanned dataset(s).

Furthermore, as illustrated, in FIG. 8, the results section 800 can include a number of violations associated with missing data detected in the scanned dataset(s). For instance, in response to determining that a particular data type of a first classification has a number of data requirement violations based on a corresponding set of digital data requirements, the client device can count the number of instances of such a violation and provide the number of instances in the results section 800. To illustrate, the missing data detection system 102 can determine that a particular classification of digital content items have 50 instances of missing data in connection with a selected data policy (and its corresponding digital data requirements). Additionally, in one or more aspects, the client device provides a link 802 to view more details associated with a particular violation (or type of violation) associated with one or more classifications of digital content items. In some aspects, the link 802 causes the client device to display In the various examples above, the missing data detection system 102 configures or otherwise causes the client device to perform the various display and/or population actions. In some aspects, software of the missing data detection system 102 executed on a server remote from the client device transmits instructions and/or data that cause the client device to provide the graphical user interface with the functionality described above. In additional or alternative aspects, software of the missing data detection system 102 executed on the client device configures the client device to provide the graphical user interface with the functionality described above with respect to FIG. 8.

FIG. 9 illustrates a client device displaying a graphical user interface for providing additional details associated with a violation corresponding to missing data detected in a dataset. For example, the client device displays a details list 900 indicating one or more violations associated with one or more classifications of data. To illustrate, the client device displays, within the details list 900, a particular classification of data and a particular violation corresponding to one or more detected instances of missing data. More specifically, the details list 900 can include a digital data requirement corresponding to detected missing data, such as a data type requirement, a time requirement, or a data storage requirement.

In additional aspects, the client device displays one or more options for remediating a violation corresponding to missing data. For instance, the client device displays a dropdown menu 902 including one or more actions for modifying one or more database operations associated with the corresponding classification and violation. To illustrate, in response to a selection of the dropdown menu 902, the client device can display one or more options for fixing a cause of the missing data corresponding to the violation. As an example, the client device can display an option to automatically correct a database operation that caused the violation (e.g., via executing operations that modify a function in an executable or script). Alternatively, the client device can display an option to correct the corresponding database operation via one or more user inputs (e.g., via a link to a separate interface).

Furthermore, in some aspects, the client device provides a link 904 to a data location corresponding to the missing data. Specifically, the missing data detection system 102 can determine that the missing data should be in a particular storage location (e.g., directory) or dataset. Accordingly, the client device can provide the link 904 as a hyperlink to the dataset or directory where the missing data should have been. The client device can display the corresponding location in response to a selection of the link 904 for further analysis of the missing data and its cause(s).

The client device can also provide additional options in connection with viewing the details associated with one or more violations of digital data requirements. For example, FIG. 9 illustrates an apply option 906 to apply remediation actions to the dataset(s) and/or database operations corresponding to the violations. Furthermore, the client device can display a new scan option 908 to initiate a new scan in connection with applying the remediation actions and/or for other reasons. To illustrate, the missing data detection system 102 can verify that a modified database operation corrects the missing data violations, such as by re-scanning and re-classifying a dataset or by testing the database operations on a test dataset.

As an example of the missing data detection system 102 detecting missing data in a dataset and providing tools for remediating the cause of the missing data, the missing data detection system 102 can perform a scanning operation on a dataset including employee data for an entity. In connection with scanning and classifying the employee data, the missing data detection system 102 determines that the dataset includes PII associated with each of a plurality of employees included in an employee list stored by the entity. In response to determining that the dataset includes specific types of data covered by one or more data policies that define specific controls for handling PII and employee data (e.g., certain types of data should be stored for at least 6 months), the missing data detection system 102 determines that the dataset is missing specific data types or digital content items. To illustrate, the missing data detection system 102 can determine that the dataset is missing a set of digital payslips for a group of employees period of time in violation of one or more digital data requirements.

In one or more aspects, the missing data detection system 102 determines that the missing data is a result of one or more database operations that handle data backups and/or automatic data deletion within the digital data repository that stores the digital payslips. Additionally, the missing data detection system 102 can determine one or more modifications to the database operation(s) to fix the cause of the missing data. For example, the missing data detection system 102 can detect that one or more lines of code are resulting in the missing data being deleted prematurely or moved to a different location. Accordingly, the missing data detection system 102 can generate instructions to cause one or more computing devices to modify the database operation (s) to correct future data backups and/or deletion events to prevent additional missing data. In some aspects, the missing data detection system 102 also locates the missing data in a different location (e.g., via classifications of data at the different location) and corrects the violation by automatically moving the missing data to the correct location.

In the various examples above, the missing data detection system 102 configures or otherwise causes the client device to perform the various display and/or population actions. In some aspects, software of the missing data detection system 102 executed on a server remote from the client device transmits instructions and/or data that cause the client device to provide the graphical user interface with the functionality described above. In additional or alternative aspects, software of the missing data detection system 102 executed on the client device configures the client device to provide the graphical user interface with the functionality described above with respect to FIG. 9.

Figure 10:
FIG. 10 illustrates an example flowchart of a process for detecting data missing from a digital data repository in connection with digital data requirements of a data policy in accordance with one or more aspects.

Turning now to FIG. 10, this figure shows a flowchart of a process 1000 of detecting data missing from a digital data repository in connection with digital data requirements of a data policy. While FIG. 10 illustrates acts according to one aspect, alternative aspects may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further aspects, a system can perform the acts of FIG. 10.

As shown, the process 1000 includes an act 1002 of generating classifications of digital content items utilizing a classifier model. In some aspects, act 1002 is implemented using one or more examples described above with respect to FIGS. 2, 4, and 8. The process 1000 also includes an act 1004 of generating mappings between the digital content items and digital data requirements. In some aspects, act 1004 is implemented using one or more examples described above with respect to FIGS. 2, 3, and 7. Additionally, the process 1000 includes an act 1006 of determining that the digital data requirements indicate missing data. In some aspects, act 1006 is implemented using one or more examples described above with respect to FIGS. 2-5, and 8. The process 1000 further includes an act 1008 of generating an indication of the missing data for display at a client device. In some aspects, act 1008 is implemented using one or more examples described above with respect to FIGS. 5, 8, and 9.

In one or more aspects, act 1002 involves generating, utilizing a classifier model, classifications of a plurality of digital content items accessed at a digital data repository via an integration with the digital data repository. Act 1004 can involve generating, based on the classifications, mappings between the plurality of digital content items and a set of digital data requirements of a data policy. Act 1006 can involve determining, in response to generating the mappings, that the set of digital data requirements indicates data missing from the digital data repository. Act 1008 can involve generating an indication of the data missing from the digital data repository for display via a graphical user interface of a client device.

In one or more aspects, the process 1000 includes generating the classifications by causing one or more computing devices of a third-party computing system to extract the plurality of digital content items from the digital data repository. The process 1000 can also include causing the one or more computing devices of the third-party computing system to execute the classifier model to generate the classifications of the plurality of digital content items.

The process 1000 can also include generating the mappings between the plurality of digital content items and the set of digital data requirements by determining that a classification of a digital content item of the plurality of digital content items corresponds to the data policy according to a predetermined mapping between the classification and the data policy. The process 1000 can further include generating, in response to determining that the digital content item corresponds to the data policy, a mapping of the digital content item to the set of digital data requirements of the data policy based on one or more attributes of the digital content item.

The process 1000 can include determining that the set of digital data requirements indicates the data missing from the digital data repository by determining that the set of digital data requirements comprises a requirement that the plurality of digital content items include a specific data type. The process 1000 can also include determining, based on the mappings, that the plurality of digital content items do not include the specific data type.

The process 1000 can additionally include determining that the set of digital data requirements indicates the data missing from the digital data repository by determining that the classifications of the plurality of digital content items include a first classification. The process 1000 can further include determining that the set of digital data requirements includes a requirement that the plurality of digital content items comprise content classified with a second classification in response to determining that the classifications include the first classification. Additionally, the process 1000 can include determining, based on the classifications, that the plurality of digital content items do not include content classified with the second classification.

In some aspects, the process 1000 includes determining that the set of digital data requirements indicates the data missing from the digital data repository by determining that the set of digital data requirements comprises a requirement that digital content items corresponding to a specific classification be stored at the digital data repository for a threshold amount of time. The process 1000 can also include determining, based on the classifications of the digital content items and one or more write records associated with the digital data repository, is missing one or more digital content items required to be stored at the digital data repository for the threshold amount of time.

The process 1000 can further include generating the classifications by generating, utilizing the classifier model, a set of separate classifications for a plurality of individual data elements in a digital content item of the plurality of digital content items. The process 1000 can include generating, utilizing the classifier model, a first classification for the digital content item based on a combination of the plurality of individual data elements. The process 1000 can also include generating, utilizing the classifier model, a second classification for the digital content item based on a file type of the digital content item.

Additionally, the process 1000 can include generating the indication of the data missing from the digital data repository by determining a set of related data elements mapped to the set of digital data requirements. The process 1000 can include determining that one or more data elements of the set of related data elements are stored at the digital data repository. The process 1000 can also include determining that one or more data elements of the set of related data elements are missing from the digital data repository. The process 1000 can further include generating, for display via the graphical user interface, a notification comprising an indication of set of related data elements including an indication of the one or more data elements stored at the digital data repository and the one or more data elements missing from the digital data repository.

The process 1000 can include causing one or more computing devices of a third-party computing system having access to the digital data repository to modify one or more database operations related to the data missing from the digital data repository according to the set of digital data requirements. The process 1000 can alternatively include modifying, at the digital data repository, one or more database operations related to storing data corresponding to one or more classifications of the data missing from the digital data repository according to the set of digital data requirements.

In additional aspects, the process 1000 includes generating, utilizing a classifier model, classifications of a plurality of digital content items accessed at a third-party computing system via an integration with the third-party computing system. The process 1000 can include generating, based on the classifications, mappings between the plurality of digital content items and a set of digital data requirements of a data policy. The process 1000 can include determining, in response to generating the mappings, that the set of digital data requirements indicates data missing from the plurality of digital content items. The process 1000 can further include causing, via the integration with the third-party computing system, one or more computing devices to implement a control associated with the plurality of digital content items in response to the set of digital data requirements indicating the data missing from the plurality of digital content items.

The process 1000 can include generating the classifications by causing, via software installed at the third-party computing system, the one or more computing devices of the third-party computing system to extract the plurality of digital content items from a digital data repository. The process 1000 can also include causing, via the software installed at the third-party computing system, the one or more computing devices of the third-party computing system to execute the classifier model to generate the classifications of the plurality of digital content items.

In some aspects, the process 1000 includes generating the mappings between the plurality of digital content items and the set of digital data requirements by determining predetermined mappings between the classifications and the data policy. The process 1000 can also include determining that a classification of a digital content item of the plurality of digital content items corresponds to the data policy according to the predetermined mappings. The process 1000 can further include generating, in response to determining that the digital content item corresponds to the data policy, a mapping of the digital content item to the set of digital data requirements of the data policy based on one or more attributes of the digital content item.

The process 1000 can include determining that the set of digital data requirements indicates the data missing from the plurality of digital content items by determining that the set of digital data requirements comprises a requirement that the plurality of digital content items include a specific data type in connection with a specific classification of digital content items. The process 1000 can include determining, based on the mappings of the plurality of digital content items and additional context data associated with the plurality of digital content items, that the specific classification corresponds to a subset of the plurality of digital content items. The process 1000 can also include determining that the plurality of digital content items are missing the specific data type in response to determining that the subset of the plurality of digital content items are missing the specific data type.

In some aspects, the process 1000 includes determining that the set of digital data requirements indicates the data missing from the plurality of digital content items by determining, based on the classifications of the plurality of digital content items, that the plurality of digital content items comprise a first data type. The process 1000 can further include determining that the set of digital data requirements comprises a requirement that the plurality of digital content items include a second data type with the first data type. The process 1000 can also include determining, based on the mappings, that the plurality of digital content items do not include the second data type with the first data type.

In one or more aspects, the process 1000 includes causing the one or more computing devices to implement the control associated with the plurality of digital content items by determining, in response to the set of digital data requirements indicating the data missing from the plurality of digital content items, a modification to a database operation with access to the plurality of digital content items at the third-party computing system. The process 1000 can further include causing, via software installed at the third-party computing system, the one or more computing devices to apply the modification to the database operation.

The process 1000 can also include causing the one or more computing devices to determine a data type corresponding to the data missing from the plurality of digital content items. The process 1000 can also include causing the one or more computing devices to provide, for display via a graphical user interface of a client device, a notification comprising the data type corresponding to the data missing from the plurality of digital content items.

In one or more aspects, the process 1000 includes extracting a plurality of digital content items from a digital data repository of a third-party computing system via an integration with the third-party computing system. The process 1000 can also include generating, utilizing a classifier model, classifications of the plurality of digital content items based on data elements of the plurality of digital content items. The process 1000 can further include generating, based on the classifications, mappings between the plurality of digital content items and a set of digital data requirements of a data policy. Additionally, the process 1000 can include determining, in response to generating the mappings, that the set of digital data requirements indicates data missing from the digital data repository. The process 1000 can also include providing, for display via a graphical user interface, an indication of the data missing from the digital data repository in connection with the data policy.

The process 1000 can also include determining that the set of digital data requirements indicates the data missing from the digital data repository by determining that the set of digital data requirements comprises a requirement that the plurality of digital content items include a specific data type in connection with a particular classification. The process 1000 can also include determining, based on the mappings indicating that at least one digital content item corresponds to the particular classification, that the plurality of digital content items do not include the specific data type required in connection with the particular classification.

In some aspects, the process 1000 includes generating, in connection with the indication of the data missing from the digital data repository, a recommendation to implement a control associated with a database operation with access to the plurality of digital content items. The process 1000 can also include causing, in response to a selection of the recommendation to implement the control, one or more computing devices to implement the control at the digital data repository.

Aspects of the present disclosure may comprise or utilize a special purpose or general-purpose computer including computer hardware, such as, for example, one or more processors and system memory, as discussed in greater detail below. Aspects within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, aspects of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some aspects, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Aspects of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
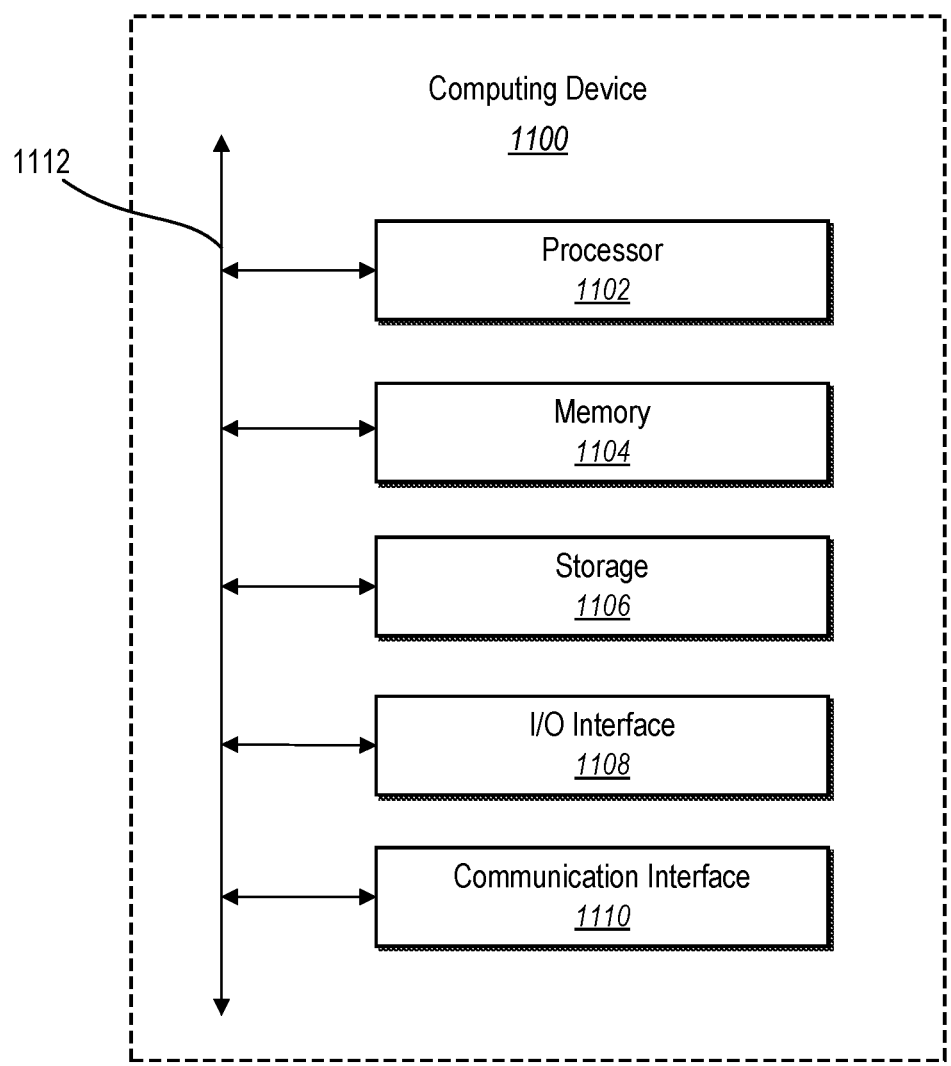
FIG. 11 illustrates an example of a computing device in accordance with one or more aspects.

FIG. 11 illustrates a block diagram of exemplary computing device 1100 that may be configured to perform one or more of the processes described above. One will appreciate that one or more computing devices such as the computing device 1100 may implement the system(s) of FIG. 1. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain aspects, the computing device 1100 can include fewer or more components than those shown in FIG. 11. Components of the computing device 1100 shown in FIG. 11 will now be described in additional detail.

In one or more aspects, the processor 1102 includes hardware for executing instructions, such as those making up a computer program. As an example, and not by way of limitation, to execute instructions for dynamically modifying workflows, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions for performing the methods described herein.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain aspects, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example, and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the processes described herein. To illustrate, the examples described above with respect to FIGS. 1-10 can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary aspects thereof. Various aspects and aspects of the present disclosure(s) are described with reference to details discussed herein, and the accompanying drawings illustrate the various aspects. The description above and drawings are illustrative of the disclosure and are not to be construed as limiting the disclosure. Numerous specific details are described to provide a thorough understanding of various aspects of the present disclosure.

The present disclosure may be embodied in other specific forms without departing from its spirit or essential characteristics. The described aspects are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
generating, by processing hardware utilizing a classifier model, classifications of each of a plurality of digital content items accessed at a digital data repository via an integration with the digital data repository;
generating, by the processing hardware and based on the classifications of each of the plurality of digital content items, mappings between the plurality of digital content items and a set of digital data requirements of a data policy by:
determining that a classification of a digital content item of the plurality of digital content items corresponds to the data policy according to a predetermined mapping between the classification and the data policy; and generating, in response to determining that the digital content item corresponds to the data policy, a mapping of the digital content item to the set of digital data requirements of the data policy based on one or more attributes of the digital content item;

determining, by the processing hardware in response to generating the mappings, that the set of digital data requirements indicates data missing from the digital data repository; and generating, by the processing hardware, an indication of the data missing from the digital data repository for display via a graphical user interface of a client device.

2. The computer-implemented method of claim 1, wherein generating the classifications comprises:
   causing one or more computing devices of a third-party computing system to extract the plurality of digital content items from the digital data repository; and
   causing the one or more computing devices of the third-party computing system to execute the classifier model to generate the classifications of the plurality of digital content items.

3. The computer-implemented method of claim 1, further comprising:
   determining, responsive to determining the data missing from the digital data repository, a cause of the data missing from the digital data repository; and
   cause, via the integration with the digital data repository and responsive to determining the cause of the data missing from the digital data repository, one or more computing devices to implement a control associated with the plurality of digital content items.

4. The computer-implemented method of claim 1, wherein determining that the set of digital data requirements indicates the data missing from the digital data repository comprises:
   determining that the set of digital data requirements comprises a requirement that the plurality of digital content items include a specific data type; and
   determining, based on the mappings, that the plurality of digital content items do not include the specific data type.

5. The computer-implemented method of claim 1, wherein determining that the set of digital data requirements indicates the data missing from the digital data repository comprises:
   determining that the classifications of the plurality of digital content items include a first classification;
   determining that the set of digital data requirements includes a requirement that the plurality of digital content items comprise content classified with a second classification in response to determining that the classifications include the first classification; and
   determining, based on the classifications, that the plurality of digital content items do not include content classified with the second classification.

6. The computer-implemented method of claim 1, wherein determining that the set of digital data requirements indicates the data missing from the digital data repository comprises:
   determining that the set of digital data requirements comprises a requirement that digital content items corresponding to a specific classification be stored at the digital data repository for a threshold amount of time; and
   determining, based on the classifications of the digital content items and one or more write records associated with the digital data repository, is missing one or more digital content items required to be stored at the digital data repository for the threshold amount of time.

7. The computer-implemented method of claim 1, wherein generating the classifications comprises:
   generating, utilizing the classifier model, a set of separate classifications for a plurality of individual data elements in a digital content item of the plurality of digital content items;
   generating, utilizing the classifier model, a first classification for the digital content item based on a combination of the plurality of individual data elements; and
   generating, utilizing the classifier model, a second classification for the digital content item based on a file type of the digital content item.

8. The computer-implemented method of claim 1, wherein generating the indication of the data missing from the digital data repository comprises:
   determining a set of related data elements mapped to the set of digital data requirements;
   determining that one or more data elements of the set of related data elements are stored at the digital data repository;
   determining that one or more data elements of the set of related data elements are missing from the digital data repository; and
   generating, for display via the graphical user interface, a notification comprising an indication of set of related data elements including an indication of the one or more data elements stored at the digital data repository and the one or more data elements missing from the digital data repository.

9. The computer-implemented method of claim 1, further comprising causing one or more computing devices of a third-party computing system having access to the digital data repository to modify one or more database operations related to the data missing from the digital data repository according to the set of digital data requirements.

10. The computer-implemented method of claim 1, further comprising modifying, at the digital data repository, one or more database operations related to storing data corresponding to one or more classifications of the data missing from the digital data repository according to the set of digital data requirements.

11. A system comprising:
   one or more non-transitory computer readable media; and
   processing hardware configured to cause the system to:
      generate, utilizing a classifier model, classifications of each of a plurality of digital content items accessed at a third-party computing system via an integration with the third-party computing system;
      generate, based on the classifications of each of the plurality of digital content items, mappings between the plurality of digital content items and a set of digital data requirements of a data policy by:
         determining that a classification of a digital content item of the plurality of digital content items corresponds to the data policy according to a predetermine mapping between the classification and the data policy; and
         generating, in response to determining that the digital content item corresponds to the data policy, a mapping of the digital content item to the set of digital data requirements of the data policy based on one or more attributes of the digital content item;

determine, in response to generating the mappings, that the set of digital data requirements indicates data missing from the plurality of digital content items; and cause, via the integration with the third-party computing system, one or more computing devices to implement a control associated with the plurality of digital content items in response to the set of digital data requirements indicating the data missing from the plurality of digital content items.

12. The system of claim 11, wherein the processing hardware is configured to cause the system to generate the classifications by:

causing, via software installed at the third-party computing system, the one or more computing devices of the third-party computing system to extract the plurality of digital content items from a digital data repository; and causing, via the software installed at the third-party computing system, the one or more computing devices of the third-party computing system to execute the classifier model to generate the classifications of the plurality of digital content items.

13. The system of claim 11, wherein the processing hardware is further configured to:

determine, responsive to determining the data missing from the plurality of digital content items, a cause of the data missing from the plurality of digital content items; and cause, via the integration with the third-party computing system, the one or more computing devices to implement the control responsive to determining the cause of the data missing from the plurality of digital content items.

14. The system of claim 11, wherein the processing hardware is configured to cause the system to determine that the set of digital data requirements indicates the data missing from the plurality of digital content items by:

determining that the set of digital data requirements comprises a requirement that the plurality of digital content items include a specific data type in connection with a specific classification of digital content items;

determining, based on the mappings of the plurality of digital content items and additional context data associated with the plurality of digital content items, that the specific classification corresponds to a subset of the plurality of digital content items; and determining that the plurality of digital content items are missing the specific data type in response to determining that the subset of the plurality of digital content items are missing the specific data type.

15. The system of claim 11, wherein the processing hardware is configured to cause the system to determine that the set of digital data requirements indicates the data missing from the plurality of digital content items by:

determining, based on the classifications of the plurality of digital content items, that the plurality of digital content items comprise a first data type;

determining that the set of digital data requirements comprises a requirement that the plurality of digital content items include a second data type with the first data type; and determining, based on the mappings, that the plurality of digital content items do not include the second data type with the first data type.

16. The system of claim 11, wherein the processing hardware is configured to cause the system to cause the one or more computing devices to implement the control associated with the plurality of digital content items by:

determining, in response to the set of digital data requirements indicating the data missing from the plurality of digital content items, a modification to a database operation with access to the plurality of digital content items at the third-party computing system; and causing, via software installed at the third-party computing system, the one or more computing devices to apply the modification to the database operation.

17. The system of claim 11, wherein the processing hardware is configured to cause the system to cause the one or more computing devices to:

determine a data type corresponding to the data missing from the plurality of digital content items; and provide, for display via a graphical user interface of a client device, a notification comprising the data type corresponding to the data missing from the plurality of digital content items.

18. A non-transitory computer readable medium comprising instructions that, when executed by processing hardware, cause the processing hardware to perform operations comprising:

extracting a plurality of digital content items from a digital data repository of a third-party computing system via an integration with the third-party computing system;

generating, utilizing a classifier model, classifications of each of the plurality of digital content items based on data elements of the plurality of digital content items;

generating, based on the classifications of each of the plurality of digital content items, mappings between the plurality of digital content items and a set of digital data requirements of a data policy by:

determining that a classification of a digital content item of the plurality of digital content items corresponds to the data policy according to a predetermined mapping between the classification and the data policy; and generating, in response to determining that the digital content item corresponds to the data policy, a mapping of the digital content item to the set of digital data requirements of the data policy based on one or more attributes of the digital content item;

determining, in response to generating the mappings, that the set of digital data requirements indicates data missing from the digital data repository; and providing, for display via a graphical user interface, an indication of the data missing from the digital data repository in connection with the data policy.

19. The non-transitory computer readable medium of claim 18, wherein determining that the set of digital data requirements indicates the data missing from the digital data repository comprises:

determining that the set of digital data requirements comprises a requirement that the plurality of digital content items include a specific data type in connection with a particular classification; and determining, based on the mappings indicating that at least one digital content item corresponds to the particular classification, that the plurality of digital content items do not include the specific data type required in connection with the particular classification.

20. The non-transitory computer readable medium of claim 18, wherein the operations further comprise:

generating, in connection with the indication of the data missing from the digital data repository, a recommendation to implement a control associated with a database operation with access to the plurality of digital content items; and causing, in response to a selection of the recommendation to implement the control, one or more computing devices to implement the control at the digital data repository.

* * * * *